US010489826B2

(12) United States Patent
Matthews et al.

(10) Patent No.: US 10,489,826 B2
(45) Date of Patent: Nov. 26, 2019

(54) SYSTEMS AND METHODS FOR SUBMITTING USER SELECTED PROFILE INFORMATION TO AN ADVERTISER

(71) Applicant: Rovi Guides, Inc., San Carlos, CA (US)

(72) Inventors: Sean Matthews, Los Altos, CA (US); Benjamin Maughan, Pleasanton, CA (US); Paul T. Stathacopoulos, San Carlos, CA (US)

(73) Assignee: Rovi Guides, Inc., San Jose, CA (US)

( * ) Notice: Subject to any disclaimer, the term of this patent is extended or adjusted under 35 U.S.C. 154(b) by 307 days.

(21) Appl. No.: 15/391,486

(22) Filed: Dec. 27, 2016

(65) Prior Publication Data

US 2018/0181996 A1 Jun. 28, 2018

(51) Int. Cl.
*G06Q 30/00* (2012.01)
*G06Q 30/02* (2012.01)

(52) U.S. Cl.
CPC ............... *G06Q 30/0269* (2013.01)

(58) Field of Classification Search
CPC ............... G06Q 30/00207–30/0284
USPC .............................. 705/14.1–14.73
See application file for complete search history.

(56) References Cited

U.S. PATENT DOCUMENTS

| 5,794,210 | A | * | 8/1998 | Goldhaber | ......... | G06Q 30/0207 |
| | | | | | | 705/14.69 |
| 6,388,714 | B1 | | 5/2002 | Schein et al. | | |
| 6,756,997 | B1 | | 6/2004 | Ward, III et al. | | |
| 7,165,098 | B1 | | 1/2007 | Boyer et al. | | |
| 7,761,892 | B2 | | 7/2010 | Ellis et al. | | |
| 8,046,801 | B2 | | 10/2011 | Ellis et al. | | |
| 2001/0004733 | A1 | * | 6/2001 | Eldering | ................ | G06Q 20/20 |
| | | | | | | 705/14.41 |
| 2001/0043364 | A1 | | 11/2001 | Messner | | |
| 2002/0174430 | A1 | | 11/2002 | Ellis et al. | | |
| 2003/0110499 | A1 | | 6/2003 | Knudson et al. | | |
| 2005/0251827 | A1 | | 11/2005 | Ellis et al. | | |
| 2006/0168664 | A1 | | 7/2006 | Frank et al. | | |
| 2006/0282328 | A1 | | 12/2006 | Gerace | | |
| 2008/0015878 | A1 | | 1/2008 | Feng et al. | | |

(Continued)

FOREIGN PATENT DOCUMENTS

WO   WO-02/057972 A2   7/2002
WO   WO-2015/138601 A1   9/2015

OTHER PUBLICATIONS

U.S. Appl. No. 15/391,444, filed Dec. 27, 2016, Sean Matthews.

*Primary Examiner* — John Van Bramer
(74) *Attorney, Agent, or Firm* — Haley Guiliano LLP

(57) ABSTRACT

Systems and methods are described herein for allowing a user to grant or deny a third party access to different portions of the user's profile characteristics. Control circuitry may calculate an optimal promotion offer from a third party to a user based on a first layer of the user's profile characteristics matching a target-audience profile of the third party. Control circuitry may then generate for display the optimal promotion offer to the user. In response to receiving a selection of the optimal promotion offer from the user, control circuitry may receive further selections, from the user, of a subset of the user's profile characteristics to share with the third party, and then generate for display, to the user, an actual promotion offer based on the selected subset of profile characteristics.

16 Claims, 12 Drawing Sheets

(56) References Cited

U.S. PATENT DOCUMENTS

| | | |
|---|---|---|
| 2011/0276408 A1 | 11/2011 | Toole |
| 2014/0289036 A1* | 9/2014 | Aurigemma ....... G06Q 30/0202 |
| | | 705/14.42 |
| 2016/0014134 A1 | 1/2016 | Holson |
| 2018/0184168 A1 | 6/2018 | Matthews |

* cited by examiner

200

```
HELLO, AMY. ~202   204                    JUNE 21, 2016   17:00

[HOME]      ⬅ WHICH OF THE FOLLOWING WOULD YOU LIKE TO SHARE
               WITH CITY ATHLETICS IN EXCHANGE FOR DISCOUNTS?
            210┐         220┐              230┐
[SETTINGS]  [BASIC LAYER] [BEHAVIORAL LAYER]  [XXX.... LAYER]

☐ NAME        ☐ VIDEO VIEWING HISTORY  ☐ XXX....
            ☐ ADDRESS     ☐ SHOPPING HISTORY       ☐ XXX....
            ☒ GENDER      ☒ SPORTS PREFERENCE
            ☒ AGE         ☐ SELECT ALL
 ─206
[LOG OUT]   ☒ EDUCATION

YOUR TOTAL SAVINGS:    15% OFF ~240    85°F/☀
```

```
CENTRAL EXCHANGE ~304                      JUNE 21, 2016   18:00

[HOME]    DEFINE TARGET AUDIENCE CHARACTERISTICS AND COUPONS:
                              312┐              314┐
[SETTINGS] ☒ AGE: ~310         [20-30  ▼]       [2%    ▼]

☐ GENDER: ~320     [PLEASE SELECT ▼] [- -   ▼]
                               322┘              324┘
           ☒ EDUCATION~330

340┐                342┐              344┐
 ─306      ☒ SPORTS PREFRENCE  [BASE BALL  ▼]    [½ %   ▼]
[LOG OUT]
           350┐
           [ADD A ROW]
```

FIG. 3

SYSTEMS AND METHODS FOR SUBMITTING USER SELECTED PROFILE INFORMATION TO AN ADVERTISER

BACKGROUND

In related art, merchants profile users based on information known to those merchants, and target advertisements to those users based on the profiles of those users. These related art systems, however, do not locate deficiencies in the information known to those merchants, or request information to fill those deficiencies from the users. In addition, a user has very little control over if, or how, her profile information is used. In some instances, when the user accesses a merchant portal, the user may be asked to "agree" to share her profile information in order to continue using the merchant portal's services. However, the user is usually not told with whom the merchant plans to share her profile information, or under what circumstances will the sharing be carried out. In addition, in such systems in the related art, while the merchant retains flexibility to share the user's profile information with multiple advertisers or merchants without having to request permission from the user again, the advertisers and merchants are faced with ineffective advertising because they may have to pay for advertisements presented to users who might have no interest in their services or products.

SUMMARY

Systems and methods are provided herein for identifying information that is not publicly available about a user that would allow a merchant to better target a promotion to the user, and for targeting a query to the user that asks about the identified information. For example, a merchant may learn from one or more public databases and/or its own private databases about a user's demographic information (e.g., age, gender, etc.), and about a user's preferences (e.g., information that describes what a user likes, such as whether a user enjoys playing a particular sport). The merchant may also learn from these databases about a user's behavior, such as how a user reacts to certain types of promotions, such as how a user reacts to a large discount for a certain type of item versus a small discount for the certain type of item.

The merchant may add this information to a private database where the merchant also stores information known to the merchant based on the merchant's interactions with the user (e.g., purchase history, how a user reacted to the merchant's earlier discounts, etc.). The merchant may determine, based on combining the information from its private and public databases, what further information the merchant could benefit from in order to better target promotions to the user. The merchant may thereby create queries for the user that seek out this further information.

To this end and others, in some aspects of the disclosure, a media guidance application may determine an identity of a user accessing a merchant portal, and may access a database accessible to the merchant comprising a profile corresponding to the user. The media guidance application may retrieve, from the profile of the database, information about the user. The information of the publicly available database may comprise, among other things, (1) demographic information about the user, (2) preferences of the user, and (3) behavioral information about the user. For example, the media guidance application may determine, based on the information of the publicly available database, that the user is a male in his thirties, who has purchased multiple sets of ski gears over the past five years and has repeatedly dismissed advertisements on snowboards.

In some embodiments, the media guidance application may retrieve a plurality of target audience profiles associated with a merchant corresponding to the merchant portal. The media guidance application may compare the information about the user to information of each of the target audience profiles of the plurality of target audience profiles, and may determine, based on the comparing, a first subset of target audience profiles of the plurality of target audience profiles where a first threshold amount of the information about the user matches the information of a respective target audience profile. The "first subset of target audience profiles" as used herein refers to one or more target audience profiles that match with at least part of the user's profile. In the example above, the media guidance application may determine a number of target audience profiles that match with "male," "thirties," or "ski" and group them as the first subset of target audience profiles. The media guidance application may also determine, based on the comparing, a second subset of target audience profiles of the plurality of target audience profiles where a second threshold amount of the information about the user is contradictory to the information of the respective target audience profile. The "second subset of target audience profiles" as used herein refers to one or more target audience profiles that evidently do not match with any part of the user's profile. Continuing with the example above, the media guidance application may determine a number of target audience profiles that not only fail to match with any of the known information about the user, but also includes "snowboard" as a known preference, and may group these target audience profiles as the second subset. In other words, the first subset of target profiles captures definitive matches for the user, whereas the second subset of target profiles captures definitive non-matches.

The media guidance application may then generate a third subset of the target audience profiles by filtering the first subset of the target audience profiles and filtering the second subset of the target audience profiles from the plurality of target audience profiles. For example, the third subset includes target audience profiles for which further information about the user is required to determine whether the user fits within the target audience profile. The media guidance application may generate a query for the user that requests information that will enable a given target audience profile of the third subset to be added to the first subset or to be added to the second subset.

In some embodiments, the media guidance application may add the information about the user to a private database accessible to the merchant, thus supplementing the information the merchant already had about the user with publicly available information about the user. The media guidance application may receive a reply to the query, and may determine a kind of information of the reply by determining whether the reply includes demographic information, preference information, or behavioral information. The media guidance application may update the information about the user by adding the information of the reply to, in the private database, either the demographic information about the user, the preference information about the user, or the behavioral information about the user based on the determination of the kind of information of the reply.

In some embodiments, the media guidance application may access a knowledge graph. The media guidance application may determine, based on information of the knowledge graph, a strength of association between the information of the reply and additional information. In response to determining that the strength of association exceeds a threshold strength of association, the media guidance application may add the additional information to the private database.

In some embodiments, the media guidance application may determine whether the updated information about the user has an amount of information that matches information of the given target audience profile of the third subset that meets or exceeds the first threshold amount of information. In response to determining that the updated information about the user has an amount of information that matches information of the given target audience profile of the third subset that meets or exceeds the first threshold amount of information, the media guidance application may provide a promotion to the user for a product or service corresponding to the given target audience profile of the third subset.

In some embodiments, the media guidance application may monitor whether the user acts on the promotion. In response to determining that the user acts on the promotion, the media guidance application may update the behavioral information in the private database.

In some embodiments, when updating the behavioral information in the private database, the media guidance application may access a knowledge graph. The media guidance application may determine a strength of association between the updated behavioral information and additional behavioral information in the knowledge graph. In response to determining that the strength of association exceeds a threshold strength of association, the media guidance application may further update the behavioral information to include the additional behavioral information.

In some embodiments, further in response to determining that the user acts on the promotion, the media guidance application may determine a set of attributes that correspond to a manner in which the user acted on the promotion. The media guidance application may compare the set of attributes to attributes of other target audience profiles of the third subset, and may determine, based on comparing the set of attributes to the attributes of other target audience profiles of the third subset, a fourth subset of target audience profiles. The media guidance application may generate another query for the user that requests further information that will enable a given target audience profile of the fourth subset to be added to the first subset or to be added to the second subset.

In some embodiments, the media guidance application may compare the set of attributes to attributes of target audience profiles of the first subset. The media guidance application may determine whether a threshold amount of the set of attributes do not match the attributes of a given target audience profile of the first subset, and, in response to determining that the threshold amount of the set of attributes do not match the attributes of the given target audience profile of the first subset, the media guidance application may remove the given target audience profile from the first subset and add the given target audience profile to the second subset.

In some embodiments, the media guidance application may determine, based on the monitoring, that the user fails to act on the promotion during a threshold period of time. In response to determining that the user fails to act on the promotion during the threshold period of time, the media guidance application may add the given target audience profile of the third subset to the second subset, and may remove the given target audience profile of the third subset from the third subset.

In some embodiments, the query is provided to the user by way of a set-top box. For example, the query may be generated for display by the media guidance application, which is at least partially installed on a set-top box, for display on a television. The query may relate to programming presently displayed on the television.

Systems and methods are also provided herein for allowing a user to grant or deny a third party access to different portions of the user's profile characteristics. The systems and methods may let the user specify a number of profile characteristics to be shared with a particular third party in response to receiving the user's selection of an offer from the third party. Based on the profile characteristics that the user chooses to share with the third party, the systems and methods may calculate a promotion offer that is specific to the user and display the promotion offer to the user. In this manner, the third party (e.g., an advertiser or a merchant) may more effectively target users who are likely to be interested in their products or services, and the user can better take control of her own profile information and decide which portion of the profile to share, with whom, under what circumstances, and in exchange for what promotion.

To these ends and other ends, in some aspects of the disclosure, a media guidance application may compare a plurality of layers of profile characteristics associated with a user to a target-audience profile submitted by a third party. For example, the plurality of layers of profile characteristics of the user may include a Basic Demographic Information layer, a Behavioral layer, and an Online Profile layer. The media guidance application may compare the plurality of layers against a target audience profile submitted by a business, such as "City Athletics", a hypothetical store that specializes in sports gears in urban centers. In this example, the target audience profile may indicate that the business prefers to target users who are 20-30 years old living in an urban environment, have at least a college degree, and whose shopping histories indicate that they love shopping for sports goods in general.

In some embodiments, in response to determining that a first layer of the plurality of layers matches the target audience profile, the media guidance application may calculate an optimal promotion offer from the third party based on the first layer of profile characteristics, and generate for display the optimal promotion offer to the user. For example, the media guidance application may determine that Amy, whose layer of basic demographic information indicates that she is a 23-year-old graduate student living in New York City, has a first layer that matches the target-audience profile that City Athletics wishes to target. In response to the determination, the media guidance application may calculate that the optimal promotion City Athletics is willing to offer to Amy is a 20% discount based on her demographic information as reflected in her matching Basic Demographic Information layer. Subsequently, the media guidance application may generate the optimal promotion offer for display to Amy, e.g., "Amy, you can save as much as 20% by shopping at City Athletics now!" as a banner advertisement when Amy searches for sports goods, or visits any other merchant portal where such an advertisement can be placed. In some embodiments, the calculation of optimal promotion offer may be performed by the third party instead of the media guidance application. In some other embodiments, the media guidance application may calculate the optimal promotion offer for the user according to some rules set forth by the third party ahead of time.

In some embodiments, the media guidance application may have little information on the user prior to the user browsing the web page, and the foregoing matching may not happen instantaneously. In these embodiments, the media guidance application may incentivize the user to select or share profile information by way of a notification message. The media guidance application may generate the notification message as a popup window, an alert box, a short video, a sound, a text message, a web page allowing the user to enter profile information, or any other means to incentivize the user to share profile information. For example, if the media guidance application knows very little about Amy's profile when Amy first opens the web page of City Athletics, the media guidance application may not determine whether Amy's profile matches the target audience profile at this stage. Instead, the media guidance application may allow Amy to enter a plurality of her profile characteristics (e.g., profile characteristics in a particular layer) to share, in real time, with City Athletics in exchange for instantaneous discounts. In some embodiments, the real-time nature of the present disclosure may allow the user to select profile characteristics to share with a particular third party advertiser or merchant and receive a response in the form of a personalized discount from the third party advertiser or merchant, at substantially the same time.

In some embodiments, the media guidance application may receive a first selection of the optimal promotion offer from the user. In response to receiving the first selection, the media guidance application may generate for display the first layer of profile characteristics to the user, whereby each profile characteristic of the first layer may have a corresponding selectable option to grant the third party access to its corresponding profile characteristic. For example, in response to receiving a selection of the banner advertisement from Amy, the media guidance application may generate for display to her each and every profile characteristic from the "Basic Demographic Information" layer as selectable options, such as a selectable option for the profile characteristic "Age," a selectable option for the profile characteristic "Address," a selectable option for the profile characteristic "Education," and a selectable option for the profile characteristic "Gender." Amy may select one or more of these selectable options to indicate her permission to grant City Athletics access to her information in a corresponding profile characteristic.

In some embodiments, the media guidance application may receive a second selection from the user to grant the third party access to a subset of the profile characteristics within the first layer of profile characteristics. For example, the media guidance application may receive selections from Amy to grant City Athletics access to the profile characteristics "Age," "Education," and "Gender," but not "Address." In this manner, Amy has granted City Athletics access to her age (23-year-old), education level (college), and gender (female) information, while denying City Athletics access to her address in New York City.

In some embodiments, the media guidance application may calculate an actual promotion offer from the third party for the user based on the subset of profile characteristics which the user has granted the third party access to. In some other embodiments, such as when the media guidance application did not have much information about the user at the beginning, the media guidance application may calculate the actual promotion offer by comparing the selected subset of profile characteristics against the target audience profiles defined by the third party in the target audience profile. In some embodiments, the actual promotion offer, which corresponds to the actual profile characteristics shared with the third party, is not greater than the optimal promotion offer, which corresponds to the maximum amount of profile characteristics that can be shared with the third party. In some embodiments, the actual promotion offer is not based on any profile characteristics outside of the selected subset. In some further embodiments, the actual promotion offer can be based on any profile characteristics in the subset that the user has selected, within or outside of the first layer of profile characteristics. Continuing with the examples from above, the subset of profile characteristics that Amy has selected includes "Age," "Education," and "Gender" information, but does not include "Address" information. Although the optimal promotion offer City Athletics would have been able to offer to Amy is 20% had Amy selected to share all four, the media guidance application may calculate an actual promotion offer of 15% because Amy only selected to share her age, education, and gender information, but not her address information. In some embodiments, the calculation of actual promotion offer may be performed by the third party instead of the media guidance application. In some other embodiments, the media guidance application may calculate the actual promotion offer for the user according to some rules set forth by the third party ahead of time.

In some embodiments, the media guidance application may generate for display the actual promotion offer to the user. For example, the media guidance application may generate the 15% promotion offer and present it to Amy by displaying an advertising statement: "Amy, based on the information you shared with City Athletics, your store-wide discount for shopping there is 15%!"

In some embodiments, the media guidance application calculates the optimal promotion offer from the third party assuming that the user has granted the third party access to a predetermined subset of profile characteristics within the first layer. In some embodiments, the predetermined subset of profile characteristics corresponds to some or all profile characteristics associated with the user that the third party does not yet know from other sources (e.g., from the public database). For example, the media guidance application may calculate the optimal promotion offer of 20% for Amy with the assumption that she had granted City Athletics access to a predetermined subset of profile characteristics in her "Basic Demographic Information" layer—i.e., "Age," "Education," "Gender," and "Address." In some embodiments, the media guidance application calculates the optimal promotion offer from the third party based on the predetermined subset of matching profile characteristics that the user has relative to the target-audience profile established by the third party, throughout every layer. For example, the media guidance application may calculate the optimal promotion offer of 20% for Amy based on not only the "Basic Demographic Information" layer characteristics of Amy, but also her "Behavioral" layer characteristics that match the target-audience profile established by City Athletics.

In some embodiments, the media guidance application may receive the second selection from the user to grant the third party access to both the subset of the profile characteristics within the first layer and profile characteristics within a second layer of profile characteristics, even if the matching was only based on the user's selection of the profile characteristics within the first layer. For example, the media guidance application may receive from Amy selections of "Age," "Education," and "Gender," which belong to the subset of the profile characteristics of the first layer, as well as "Shopping Preferences," which belong to the "Behavioral Layer" of her profile characteristics. In this way, even though the matching was based on Amy's profile characteristics in her "Basic Demographic Information Layer," she might choose to grant City Athletics access to additional profile characteristic(s) in her "Behavioral Layer" in exchange for higher potential discount from the City Athletics.

In some embodiments, the media guidance application may calculate the actual promotion offer from the third party based on both the subset of profile characteristics within the first layer and a further subset of profile characteristics within the second layer. For example, the media guidance application may take into account Amy's selections to grant City Athletics access to both her "Age" and "Education" profile characteristics in the "Basic Demographic Information Layer" and the "Shopping Preferences" profile characteristic in the "Behavioral Layer" when calculating the actual promotion offer from City Athletics. As before, the calculation of the actual promotion offer may be performed by the third party instead of the media guidance application in some embodiments. In some further embodiments, the media guidance application may calculate the actual promotion offer for the user according to some rules set forth by the third party ahead of time.

The media guidance application may, in some embodiments, generate for display the actual promotion offer by displaying a targeted advertisement for a product associated with the user's profile characteristics. For example, rather than offering a store-wide discount of 15% to Amy, the media guidance application may generate for display a 20% discount on all skiing gears for Amy at City Athletics, which are associated with certain profile information from Amy, or are associated with the season, time of the year, weather, etc.

In some embodiments, in response to receiving a selection from the user to dismiss the optimal promotion offer, the media guidance application may reduce the probability of generating future promotion offers associated with the third party. For example, Amy may not be interested in the 20% optimal promotion offer from City Athletics and chooses to dismiss the banner advertisement by clicking on a "dismiss" option for the advertisement. In some embodiments, the media guidance application may take this as an indication that Amy is not interested in promotion offers from City Athletics at present, and reduce the probability of generating future promotion offers from City Athletics from once per week to once per month. In some embodiments, the media guidance application may learn from the user's consecutive dismissals of promotion offers from a particular third party over time and understand that the user does not wish to see advertisements from the third party again. For example, the media guidance application may set a threshold number of dismissals and determine that the user's prior dismissals exceeded the threshold. As a result, the media guidance application may refrain from generating future promotion offers from that particular third party to the user again.

In some embodiments, the media guidance application may calculate the actual promotion offer by extracting a plurality of target characteristics from the target-audience profile submitted by the third party; counting a number of profile characteristics from the subset that matches the plurality of target characteristics; and calculating a matching score for the user based on the number of matching profile characteristics in the subset. For example, from the target audience profile of someone who is 20-30 years old living in an urban environment and whose shopping history indicates that she love shopping for sports gears, the media guidance application may extract four target characteristics—"Age," "Education," "Address," and "Shopping Preference"—for City Athletics. The media guidance application may compare the target characteristics against the user's profile characteristics and count a number of profile characteristics that matches the target. In this case, although Amy's profile characteristics include "Age," "Education," "Gender," and "Address," only three of these are included in the subset previously selected by Amy, i.e., "Age," "Education," and "Gender." Comparing the subset of Amy's three profile characteristics against the four target characteristics from City Athletics, the media guidance application will count only two of Amy's profile characteristics—"Age" and "Education"—as matching. Subsequently, the media guidance application may calculate a matching score for Amy based on the two matching profile characteristics. The matching score, in some embodiments, is just a sum of the number of matching profile characteristics. In the above example, the matching score for Amy under this binary-scoring system is 2. In some other embodiments, the media guidance application may use a suitable algorithm, such as those discussed below, to calculate the matching score.

In some embodiments, the media guidance application may calculate the matching score based on a degree of matching between a target characteristic and a corresponding profile characteristic of the user's. For example, in a non-binary scoring system (i.e., for each characteristic, there can be more than two possible outcomes), the media guidance application may determine a sub-score to each profile characteristic. The sub-score measures the degree of matching between the target characteristic and the corresponding profile characteristic. In some embodiments, the assigned score may be provided by the third party. For example, City Athletics may sub-divide its target audience profile of "Age" (i.e., 20-30 years old) into five sub-scores, and direct the media guidance application to assign a sub-score of 5 to users who are 20 and 21, a sub-score of 2 to users who are 22 and 23, . . . and a sub-score of 3 to users who are 28, 29, and 30. In this example, Amy, who is 23 years old, will have a sub-score of 2 for her matching "Age" profile characteristic. Assuming Amy receives a sub-score of 5 for her "Education" profile characteristic that matched the target audience profile from City Athletics, her matching score for City Athletics would be 7, by adding 2 (for "Age") and 5 (for "Education"). In some embodiments, the sub-scores reflect the third party's target audience profile in multiple dimensions. In this manner, the third party is not limited to defining a single target audience profile, and can be flexible in refining its target audience characteristics to better target receptive users.

In some embodiments, the media guidance application may calculate the matching score for the user based on a weighted average of the matching profile characteristics in the subset. For example, the media guidance application may assign a weight to each of Amy's matching profile characteristics—"Age" and "Education"—and calculate the matching score based on the weighted average of the two. If City Athletics determines that having a college degree is a stronger indicator of someone's interest in its products than her age, for instance, City Athletics may direct the media guidance application to assign a higher weight (e.g., 60%) to the "Education" profile characteristic and a lower weight (e.g., 40%) to the "Age" profile characteristic in the event of a match. In this manner, following the above examples, Amy will receive a matching score of 3.8, by adding 3.0 (calculated from 60% multiplied by the score of 5, for "Education") and 0.8 (calculated from 40% multiplied by the score of 2, for "Age"). These and any other suitable algorithms for computing the matching score are within the scope of this disclosure.

In some embodiments, the media guidance application may calculate the actual promotion offer by determining a maximum matching score for the user corresponding to the optimal promotion offer attainable by that user. The media guidance application may compare the matching score against the maximum matching score to calculate a percentage value, and multiply the percentage value with the optimal promotion offer to obtain the actual promotion offer for the user. For example, based on the three target characteristics that Amy has ("Age," "Address," and "Education"), the media guidance application may determine that the maximum matching score attainable by a user like Amy is 15, which corresponds to the optimal promotion offer, i.e., 20%. The media guidance application may compare Amy's matching score (i.e., 7) against the maximum matching score (i.e., 15) to calculate a percentage value. In this example, the percentage value would be 46.7%. The media guidance application may subsequently multiply the percentage value with the optimal promotion offer to obtain an actual promotion offer, i.e., 9.3%, for Amy. In some embodiments, the actual promotion offer may be rounded. For instance, in the above example, Amy's actual promotion offer will be 10%.

In some embodiments, the media guidance application may include additional profile characteristics selected by the user in calculating the actual promotion offer. For example, the media guidance application may take into account Amy's selection of "Shopping Preferences" in calculating the actual promotion offer for her.

In some embodiments, the media guidance application may calculate the maximum matching score corresponding to the optimal promotion offer attainable by any user the third party wishes to target, rather than the optimal promotion offer attainable by the particular user at issue. In such cases, the third party may calculate the optimal promotion offer by assuming a hypothetical user has granted the third party access to a predetermined subset of profile characteristics within the target-audience profile. For example, City Athletics from the above examples may calculate the optimal promotion offer by assuming a hypothetical user has granted it access to "Age," "Address," "Education," as well as "Shopping Preference" profile characteristics. That optimal promotion offer may, for example, be 25%. Subsequently, the media guidance application may determine the actual promotion offer for a particular user based on this optimal promotion offer using a different percentage value.

In some embodiments, the media guidance application dynamically updates the displayed actual promotion offer based on the user's selections of profile characteristics in real time. For example, upon entering the merchant portal of City Athletics, Amy may decide that she wants to enjoy a higher discount and chooses to additionally share her "Address" profile characteristic with City Athletics as well. The media guidance application may receive this information and dynamically update the actual promotion offer for Amy, in real time, such that her actual promotion offer increases from 10% to 15%.

In some embodiments, the media guidance application may not rely on a weighted score system to determine the actual promotion offer, and may instead accumulate the actual promotion offer based on the selections of the user. In these embodiments, the actual promotion offer may exceed the optimal promotion offer as determined by the third party merchant or advertiser. The media guidance application may allow the actual promotion offer to exceed the optimal promotion offer set by the third party, or, in the alternative, the media guidance application may provide non-monetary perks to compensate the user for sharing additional layers of profile data. For example, if the optimal promotion offer as determined by the target audience profile is 30%, and the user has elected to share a large number of layers of profile data such that the actual promotion offer as calculated by the media guidance application would be 40%, the media guidance application may grant the 40% discount to the user (e.g., by offering to compensate the third party merchant the 10% difference). Alternatively, the media guidance application may allow the user to take up the optimal 30% discount while offering a free on-demand video item or other similar giveaways to the user, in order to incentivize the user to engage in future data-sharing activities on the platform.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

FIG. 2 depicts an illustrative embodiment of a user interface that allows a user to choose profile characteristics to share with a third party, in accordance with some embodiments of the disclosure;

FIG. 3 depicts an illustrative embodiment of an interface that allows a third party to define a target audience profile, in accordance with some embodiments of the disclosure;

DETAILED DESCRIPTION

The term "merchant portal" as used herein is defined to mean any electronic interface between a user and a merchant, including but not limited to a web page and an application interface, which can be displayed on any user equipment, such as a smartphone, a television, a set-top box, a personal computer, a tablet, or any other user equipment as described in relation to FIG. 10 below.

Figure 1:
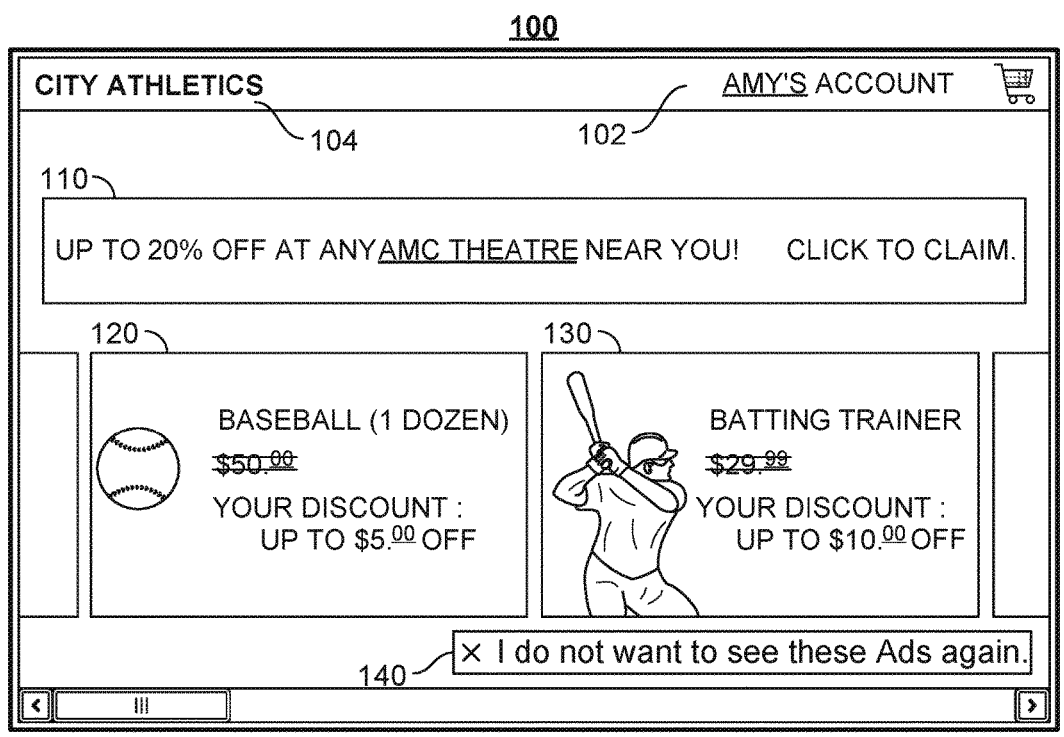
FIG. 1 depicts an illustrative embodiment of a user interface that informs a user about a potential promotion offer from a third party, in accordance with some embodiments of the disclosure.

FIG. 1 depicts an illustrative embodiment of a user interface that informs a user about a potential promotion offer from a third party, in accordance with some embodiments of the disclosure. User interface 100 as depicted in FIG. 1 may be a merchant portal generated by a media guidance application running on processing circuitry 906 and displayed on display 912 of FIG. 9. Alternatively, user interface 100 may be a merchant portal generated by the media guidance application running at a remote server and displayed on display 912 of FIG. 9. In some embodiments, the illustrative embodiment as shown in FIG. 1 may be optional, as will be made apparent in the disclosure below.

User interface 100 may be a web page or a television guidance interface that a user visits when the user is accessing the media guidance application. In some embodiments, user interface 100 is a media guidance interface (i.e., a merchant portal) of a merchant, who provides products and services, as well as advertising, to users. In such embodiments, user interface 100 may be generated by a set-top box and displayed on a television associated with the set-top box. In some embodiments, user interface 100 is a web page of a central exchange that brokers promotion deals between a user and a third party advertiser or merchant. In such systems, a media guidance application of the central exchange generates user interfaces 100 and 400 for display for the user and user interface 300 for the third party business. The media guidance application may keep the user and the third party business decoupled from each other such that targeted users are identified for a third party advertiser or merchant without revealing private information about the user in the absence of the user's explicit consent in real time. In some other embodiments, user interface 100 is an interface of a media guidance application running on servers of a third party advertiser or merchant, or a type of interface running on a proprietary application of the third party advertiser or merchant. In such systems, the media guidance application running on the third party servers generates user interfaces 100 and 400 for display for the user. In some embodiments in accordance with the present disclosure, the central exchange may be central exchange 1015 and the third party may be merchant 1017 or advertisement provider 1019 of FIG. 10. In some embodiments, central exchange 1015 may be part of media content source 1016 or media guidance data source 1018; merchant 1017 and advertisement provider 1019 may be part of media content source 1016, as will be illustrated below in relation to FIG. 10.

On user interface 100 of FIG. 1, the media guidance application located at either the central exchange or the third party merchant may display Label 102 which corresponds to the user's identity. In some embodiments, the user logs onto her account with the media guidance application in order to have label 102 displayed as illustrated. Label 104 indicates the URL of the web page or the identity of the third party merchant hosting user interface 100. In this illustrative embodiment, label 104 indicates that this interface belongs to City Athletics, a hypothetical store that specializes in sports gears in urban centers.

In some embodiments, a media guidance application running on the central exchange or the third party merchant may determine an identity of a user accessing a merchant portal. For example, as depicted in FIG. 1, the media guidance application may identify user 102 as Amy. In some embodiments, the media guidance application determines the identity of the user based on explicit input by the user. For example, the user may input credentials into the media guidance application (e.g., a user name and, optionally, a password), and the media guidance application may determine the identity of the user based on those credentials.

In some embodiments, the media guidance application does not receive explicit input by the user that identifies the user. In such cases, the media guidance application may identify the user using various user input interfaces (described below with respect to FIGS. 9 and 10. For example, the media guidance application may detect speech from the user, or an image from the user, and may use speech recognition or image recognition algorithms to identify the identity of the user. Alternatively, the media guidance application may use information about user equipment through which the user is accessing the merchant portal (e.g., network address, cookies, MAC address, or any other identifying information) to identify the identity of the user. In some embodiments, user equipment may be shared, in which case the term "identity of the user" refers to an identity of a household (or other entity) that shares the user equipment.

In some embodiments, the media guidance application may access a database that is accessible to the merchant comprising a profile corresponding to the user. Databases, such as a media guidance data source, or local storage of user equipment, as well as profiles stored thereon, are described below with reference to FIG. 10. A database accessible to the merchant is defined herein as a database including information that is either paid for or for free, which is accessible to a willing merchant. In some embodiments, the database accessible to the merchant is a public database accessible to all merchants. In some embodiments, the database accessible to the merchant is a database that is private to said merchant, which may in turn be accessible by other third party merchants for a fee or via other arrangements. The media guidance application may retrieve, from the profile of the database, information about the user. The information of the publicly available database may comprise, among other things, (1) demographic information about the user, (2) preferences of the user, and (3) behavioral information about the user.

As used herein, the term "demographic information" refers to information about a user that describes definitive, unambiguous, factual data about the user, such as an age or gender of the user. As used herein, the term "preferences of the user" describes, for example, data about a user that reflect what a user enjoys or does not enjoy, or what a user habitually does or does not do. Preferences of a user may be subject to change, and may be subject to some ambiguity in that the preferences of a user may be less granular than the demographic information about that user. For example, if a user is age 39, there is no ambiguity about the age of the user. However, if a user enjoys skiing, it may be unknown whether the user enjoys skiing beginner slopes, or advanced slopes, or whether the user enjoys downhill skiing as opposed to cross-country skiing.

As used herein, the term "behavioral information" refers to information about how a user reacts to certain stimuli. For example, behavioral information would include information about how a user reacted to a specific promotion relating to a product or service. As used herein, the term "promotion" refers to an incentive to perform a desired action. A promotion may entail a discount for the desired action or for a different activity if the desired action is performed, an administration of a free service in exchange for the performance of the desired action, a gift in exchange for the performance of the desired action, or any other financial or non-financial benefit that would be conferred on the user in exchange for the user's performance of the desired action.

In some embodiments, the media guidance application may retrieve a plurality of target audience profiles associated with a merchant corresponding to the merchant portal. For example, the merchant may be a sporting goods store called REI, which sells recreational sporting goods and services for a large variety of sports. The media guidance application may retrieve target audience profiles for each good and service that REI sells, such as target audience profiles for specific skiing equipment, specific tennis equipment, and for a vacation package to go skiing that is offered by REI including hotel accommodations, skiing tickets, and skiing equipment rentals. The term "target audience profile" as used herein defines a profile of the merchant's ideal shopper for a particular item. For example, an ideal shopper for a set of high-end skis would be a person who has enough money to purchase the skis, who has enough experience to benefit from high end skis, and who has preference data that indicates that the user actually skis, and perhaps that the user skis at a very high level and could thus benefit from the high-end skis.

In some embodiments, the media guidance application may compare the information about the user to information of each of the target audience profiles of the plurality of target audience profiles, and may determine, based on the comparing, a first subset of target audience profiles of the plurality of target audience profiles where a first threshold amount of the information about the user matches the information of a respective target audience profile. For example, if a user profile reflects that the user enjoys playing tennis, and is silent on the user's affinity toward skiing, the media guidance application may add tennis equipment to the first subset, because the user may satisfy a target audience profile for the tennis equipment and thus be a good candidate to advertise the tennis equipment to.

In some embodiments, the media guidance application may determine, based on the comparing, a second subset of target audience profiles of the plurality of target audience profiles where a second threshold amount of the information about the user is contradictory to the information of the respective target audience profile. For example, if the behavioral information of the user profile reflects that the user consistently declines vacation packages (e.g., because the user likes to organize his own trips from scratch), the media guidance application may determine that the user is unlikely to purchase the vacation package. Thus, the media guidance application may add the target audience profile for the vacation package to the second subset.

In some embodiments, the media guidance application may generate a third subset of the target audience profiles by filtering out the first subset of the target audience profiles and filtering out the second subset of the target audience profiles from the plurality of target audience profiles. Following from the above example, the media guidance application already has enough information to know that the user is an ideal candidate to be exposed to a promotion about tennis, and the media guidance application already has enough information to know that the user is very far from an ideal candidate to be exposed to a promotion about a vacation package. Thus, the media guidance application does not require additional information to determine whether to offer the user a promotion relating to the vacation package or to the tennis equipment. However, the media guidance application does not, from the publicly available information, have enough information to determine whether the user is a good candidate to be offered a promotion about skiing equipment, and thus a target audience profile for the skiing equipment may be added to the third subset.

In some embodiments, the media guidance application may add the information about the user to a private database accessible to the merchant (such as user profile database 1013), thus supplementing the information the merchant already had about the user with publicly available information about the user. For example, as described above, the merchant may keep a database that logs activity between the user and the merchant. For example, purchases by the user, the user's activity when accessing the merchant portal associated with the merchant, how often the user visits the merchant's physical store, how long the user browses the merchant's physical store and/or merchant portal, or any other interaction between the user and the merchant, may be logged in a private database. The private database may be supplemented with information available from the public database to form a more robust private database.

The media guidance application may generate a query corresponding to a target audience profile of the third subset. For example, following from the above example about the REI sporting good store, the media guidance application may seek to supplement its data in order to determine whether the user is likely to purchase the skiing equipment if the skiing equipment were promoted. Thus, the media guidance application may generate a query that asks "Do you enjoy skiing?" or "Would you consider buying skis?"

The media guidance application may generate the queries based on template queries. For example, the merchant or a third party affiliated with the merchant may populate a database with template queries (e.g., "Would you consider buying [product]?"), where portions of the queries may be filled in depending on metadata associated with the product or service that the query relates to. The media guidance application may alternatively access non-variable queries in the database, each of which are affirmatively associated with an individual product. As an example, the target audience profile for skiing equipment may have an association stored in the database with one or more queries, such as "Would you consider buying skiing equipment?" Example queries are described with reference to FIGS. 2-3 and 7-8 below.

In some embodiments, the media guidance application may entice a user to reply to a query. For example, the media guidance application may offer the user a promotion (e.g., advertisement 120 or advertisement 130) in exchange for the user replying to the query. Such promotional offers are described in further detail below.

The media guidance application may receive a reply to the query, and may determine a kind of information of the reply by determining whether the reply includes demographic information, preference information, or behavioral information. The media guidance application may determine which kind of information is included in the reply to the query based on metadata associated with the query. For example, a query may be associated with metadata that indicates whether it is asking a question relating to demographics, or whether it is asking a question relating to preference. The media guidance application may update the information about the user by adding the information of the reply to, in the private database, either the demographic information about the user, the preference information about the user, or the behavioral information about the user based on the determination of the kind of information of the reply.

Figure 10:
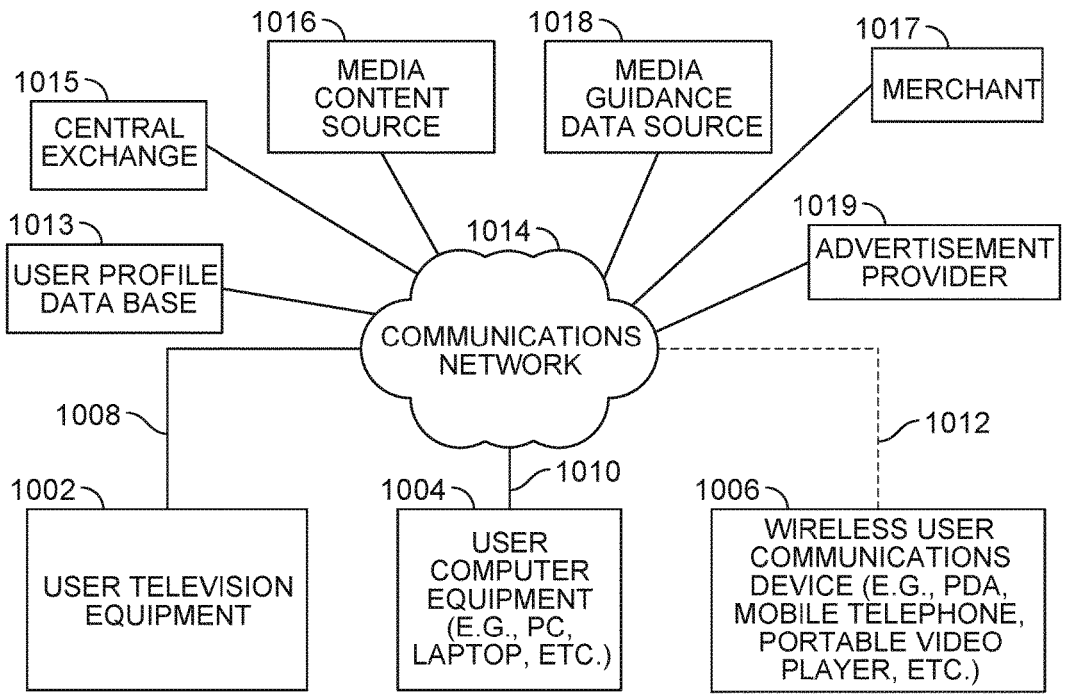
FIG. 10 is a block diagram of an illustrative media system in accordance with some embodiments of the disclosure.

In some embodiments, the media guidance application may access a knowledge graph stored in a local database, such as user profile database 1013 of FIG. 10. In some embodiments, the knowledge graph is stored in the cloud and is accessible via the Internet. The media guidance application may determine, based on information of the knowledge graph, a strength of association between the information of the reply and additional information. In response to determining that the strength of association exceeds a threshold strength of association, the media guidance application may add the additional information to the private database. Knowledge graphs and their features are described in greater detail in U.S. patent application Ser. No. 14/501,504, filed Sep. 30, 2014, U.S. patent application Ser. No. 14/500,309, filed Sep. 29, 2014, and U.S. patent application Ser. No. 14/448,308, filed Jul. 31, 2014, which are hereby incorporated by reference herein in their entireties. The threshold strength of association may be defined by data of the knowledge graph, or by an editor of the media guidance application (e.g., by a merchant).

In some embodiments, the media guidance application may determine whether the updated information about the user has an amount of information that matches information of the given target audience profile of the third subset that meets or exceeds the first threshold amount of information. In other words, after the media guidance application receives a reply to the query about ski equipment, the media guidance application may determine whether it now knows whether the user fits or does not fit the target audience profile for the ski equipment, or whether further information is required. If further information is required, the media guidance application may prompt the user with further queries (and potentially with further promotions for answering those queries).

In some embodiments, in response to determining that the updated information about the user has an amount of information that matches information of the given target audience profile of the third subset that meets or exceeds the first threshold amount of information, the media guidance application may provide a promotion to the user for a product or service corresponding to the given target audience profile of the third subset. For example, the media guidance application may target an advertisement to the user because the user fits the target audience profile of the ski equipment based on the user's answer to the query. Targeted advertisements and their features are described in greater detail in U.S. patent application Ser. No. 14/252,744, filed Apr. 14, 2014; U.S. patent application Ser. No. 12/905,467, filed Oct. 15, 2010; and U.S. patent application Ser. No. 14/140,960, filed Dec. 26, 2013, which are hereby incorporated by reference herein in their entireties.

In some embodiments, the media guidance application may monitor whether the user acts on a given promotion. For example, the media guidance application may determine whether the user acts on either a promotion given in exchange for replying to a query, or to a promotion given based on a targeted advertisement that is targeted because the user is determined to fit within a target audience profile of the product or service being promoted. In response to determining that the user acts on the promotion, the media guidance application may update the behavioral information in the private database. For example, the behavioral database may be updated with both the fact that the user acts on the promotion, as well as other information, such as the manner in which the user acted on the promotion (e.g., did the user purchase the product or service through the merchant portal, or did the user go to a physical store of the merchant to purchase the product or service), the time taken before the user acted on the promotion (e.g., did the user purchase it immediately, or did the user take a week before acting on the promotion), and the like.

In response to determining that the user does not act on the promotion, the media guidance application may also update the behavioral information in the private database based on subsequent actions taken by the user. For example, a female tennis player may be offered a discount for tennis supplies but, instead of purchasing tennis-related items, she purchases a pair of ballet shoes. The media guidance application may then update the behavioral information to indicate that the user has purchased ballet shoes, which may cause the media guidance application to take further actions (e.g., send the user a questionnaire asking if the purchase is a gift or is for herself). In some embodiments, the media guidance application may correlate the user's actions subsequent to being offered the promotion with another layer of information, and determine further inferential knowledge about the user. For example, the media guidance application may correlate the user's purchase of ballet shoes (in her behavioral layer) with her gender (in her basic demographic information layer) and deduce that the user is also a ballet dancer, based on third-party statistical information that shows there are more female ballet dancers than there are male ballet dancers.

Additionally, in some embodiments, when updating the behavioral information in the private database, the media guidance application may access a knowledge graph, and may determine a strength of association between the updated behavioral information and additional behavioral information in the knowledge graph (as described above). In response to determining that the strength of association exceeds a threshold strength of association, the media guidance application may further update the behavioral information to include the additional behavioral information. For example, if the user acted on a 20% discount on the skiing equipment, the knowledge graph may indicate that the user is likely to act on a 20% discount on related equipment, such as a helmet for skiing, and this may be added to the profile of the user.

In some embodiments, further in response to determining that the user acts on the promotion, the media guidance application may determine a set of attributes that correspond to a manner in which the user acted on the promotion. The media guidance application may compare the set of attributes to attributes of other target audience profiles of the third subset, and may determine, based on comparing the set of attributes to the attributes of other target audience profiles of the third subset, a fourth subset of target audience profiles. The media guidance application may generate another query for the user that requests further information that will enable a given target audience profile of the fourth subset to be added to the first subset or to be added to the second subset.

For example, the media guidance application, if the user purchases the skiing equipment, may prompt the user with a query such as "Did you buy the skiing equipment for yourself"? If the user replies "No," then the media guidance application may determine that the user in fact is not a good candidate to purchase additional skiing equipment. The media guidance application may provide further prompts to the user, such as "Did you buy the skiing equipment for a family member"? If the user answers yes, then the media guidance application may determine a tremendous amount of additional information about the user, such as, for example, that the user has a son, if the skiing equipment is designed for a male, child skier. The media guidance application may use the knowledge graph as described above to supplement the profile of the user on the private database with such inferences.

In some embodiments, the media guidance application may compare the attributes to attributes of target audience profiles of the first subset. The media guidance application may determine whether a threshold amount of the attributes do not match the attributes of a given target audience profile of the first subset, and, in response to determining that the threshold amount of the attributes do not match the attributes of the given target audience profile of the first subset, the media guidance application may remove the given target audience profile from the first subset and add the given target audience profile to the second subset. For example, the media guidance application may have initially concluded that the user fits a target audience profile for tennis equipment. However, the media guidance application may come to determine, based on the user's answer to the queries, that the user actually does not like tennis, and that the tennis equipment was purchased for a family member. Thus, it is unlikely that the user will continue to purchase more tennis equipment, and the media guidance application may refrain from advertising tennis equipment to the user in the future by removing an association between the target audience profile for the tennis equipment and the profile of the user.

In some embodiments, the media guidance application may determine, based on the monitoring, that the user fails to act on the promotion during a threshold period of time. In response to determining that the user fails to act on the promotion during the threshold period of time, the media guidance application may add the given target audience profile of the third subset to the second subset, and may remove the given target audience profile of the third subset from the third subset. For example, the media guidance application may give the user a targeted advertisement of a discount of 20% to purchase skiing equipment. If the user does not act on the discount by the time the promotion expires, the media guidance application may conclude that the user does not like skiing, and may refrain from advertising skiing equipment to the user going forward.

There are several ways for the user to arrive at user interface 100. For example, the user may be performing a search for "sports goods" on a popular search engine, and is directed to user interface 100 under cityathletics.com after clicking on a link from the search results. As another example, the user may be logged into her account using the media guidance application of the central exchange to view today's hot deals, and is presented with user interface 100 where various advertisements, or deals, are presented.

When the media guidance application generates user interface 100 for display to the user, the user may click on any of advertisements 110, 120, and 130 to view offers specifically for her. The advertisements may correspond to online deals, such as discounts and rebates for online shopping. For example, if the media guidance application receives a selection of advertisement 120 from the user, the user may be presented with a discount of "up to $5.00 off" that goes towards purchasing the product "Baseball (1 Dozen)" online. The advertisements may additionally correspond to offline discounts, such as a coupon to be redeemed at a physical store. For example, if the media guidance application receives a selection of advertisement 110 from the user, the user may be presented a coupon with value of "up to 20% off" at a nearby theatre.

In some embodiments, some advertisements displayed may be native advertisements from the third party merchant itself, whereas other advertisements may be unrelated to the third party's business. For example, if user interface 100 is being hosted at the third party's servers, i.e., City Athletics, at www. CityAthletics.com, advertisements 120 and 130 may relate to products sold at the online store of City Athletics, whereas advertisement 110 is related to discount coupons for movie theatres and unrelated to the business of City Athletics.

In some embodiments, advertisements 110, 120, and 130 may each correspond to an optimal promotion offer generated specifically for the user, based on the user's profile. In some embodiments, the optimal promotion offer for the user may be a maximum promotion offer that is attainable by the user. In some other embodiments, the optimal promotion offer may represent a promotion offer that is otherwise suitable for the user's overall profile without necessarily being the highest promotion offer attainable. For example, the media guidance application may generate for display a promotion offer of "10% off" as the optimal promotion offer for the user even though the maximum attainable promotion offer for the user is at 20%, because the user's shopping history indicates that the user is most likely to complete a purchase when the promotion offered is between 5% and 15%. In another example, the media guidance application may offer 10% as the optimal promotion offer instead of the maximum attainable offer of 15% because the smaller discount would allow the third party advertiser or merchant to afford more convenient services, such as "free shipping and returns," which the user's profile reflects as being more valuable than a 5% additional discount to the user. In still a further example, the media guidance application may offer "buy one get one free" instead of the usual discount offers because the user's profile indicates that she has higher propensity to complete an order when a free item is offered, as compared to a discount is offered.

In some other embodiments, the user's profile may not be available to the media guidance application. Consequently, the media guidance application may not generate advertisements 110, 120, or 130, or may generate them as regular advertisements for display without a user-specific message such as "your discount." In these embodiments, the media guidance application may generate a notification message in place of advertisements 110, 120, and 130 to incentivize the user to share additional profile characteristics. For example, the media guidance application may generate a notification message in place of advertisement 110: "Amy, tell us about yourself and receive promotion offers customized to your needs." In some embodiments, the notification message may be a request for permission to access the user's profile characteristics. For example, the media guidance application may generate another notification message in place of advertisement 120: "Amy, log in to your Facebook® account and receive customized discounts at our stores!" In the above example, if the user chooses to log in her account, the media guidance application will have received implicit permission to access additional layers of her profile characteristics. In some further embodiments, the media guidance application may request explicit, rather than implicit permissions to access additional profile characteristics from the user. For example, the media guidance application may generate a notification message in place of advertisement 130: "Amy, would you grant us permission to access your shopping history in exchange for customized discounts specifically tailored to your shopping needs? Click YES here." In this example, when the media guidance application receives the user's input to grant access to her shopping history, the media guidance application may submit the user input to a shopping site where the user's shopping history is stored, and have the user's grant of access validated in order to access her shopping history via the backend.

In some other embodiments, the advertisements 110, 120, and 130 as depicted on user interface 100 may each correspond to an optimal promotion offer generated for an ideal user as envisioned by the respective third party advertiser or merchant associated with each advertisement. The user or the "ideal user" may have a multi-layered profile including a plurality of profile characteristics, as illustrated with respect to FIG. 2 and FIG. 3 below.

In response to the media guidance application receiving user selection of one of advertisements 110, 120, and 130, the media guidance application may share the user's profile information with a corresponding third party advertiser or merchant. In some embodiments, in the event that the media guidance application does not generate the optional FIG. 1 for display, such as due to a lack of sufficient profile information about the user, the media guidance application may proceed straight to FIG. 2 and generate for display an interface 200, allowing the user to actively enter her profile characteristics to share with the third party in exchange for the possibility of receiving discounts on her subsequent purchases, as will be discussed below in relation to FIG. 2. In some embodiments, interface 200 may be a web page, a television display screen, an application portal, or any other application interface. For example, if the media guidance application knows very little profile information about Amy to begin with, the media guidance application may not generate user interface 100 for display, and may instead ask Amy to enter her profile information to share with the third party in exchange for the "opportunity to receive discounts for her purchases at the third party's web site."

In some embodiments, the media guidance application may prompt the user with a pop-up reminder that such sharing will take place, and ask the user whether to proceed. In some embodiments, as illustrated in FIG. 2, the media guidance application may ask the user to select portions of her profile to be shared with a particular advertiser or merchant. For example, in response to receiving a selection of advertisement 110 from the user, the media guidance application may generate for display a prompt to the user: "Select parts of your profile that you are willing to share with AMC in the next page. Your actual discount will be revealed immediately after your selections!" In this manner, the media guidance application incentivizes the user to share her profile information with the third party while obtaining the user's explicit permission to do so, and at the same time providing the third party a targeted audience who is likely more interested in the product offerings of the third party than the general public.

In some embodiments, the media guidance application may provide the user with an option to dismiss the optimal promotion offers from advertisements 110, 120, and 130. Selectable option 140 illustrates an example of such a dismissal option to remove advertisements 110, 120, and 130 from the user's interface 100. In response to receiving the user's selection of selectable option 140, the media guidance application may refresh user interface 100 with other offers and advertisements, and no longer display advertisements 110, 120, and 130. In some embodiments, the media guidance application may generate for display dismissal options such as option 140 for each advertisement. For example, rather than having a single selectable option 140 that dismisses every advertisement currently displayed, the user may select individual advertisements to remove advertisement 110, 120, or 130 from user interface 100.

In some embodiments, removal of a particular advertisement from display, such as advertisement 110, may reduce the probability of similar advertisements from re-appearing on the user's account. The media guidance application may limit the frequency of occurrences of advertisements similar to advertisement 110, or advertisements from the same third party as advertisement 110, for the user using a numeric frequency reduction mechanism, in response to receiving the user's selection to dismiss that particular advertisement. In this way, the media guidance application provides the user with a real-time opportunity to refine advertisements that she is interested in, while fine-tuning the audience to whom advertisements from a particular third party are presented. Overall, the media guidance application reduces ineffective marketing efforts for both sides.

In some embodiments, if the user selects a particular advertisement, such as advertisement 120, the media guidance application may direct the user to FIG. 2, where the user is able to select which profile characteristics from her profile to share with the particular third party associated with the selected advertisement. In some embodiments, if the media guidance application that generated user interface 100 for display is the third party merchant or advertiser, it may prompt the user that she will be re-directed to an interface of the media guidance application where she can set up and edit her profile to indicate which portion of her profile information to share with the third party. For example, upon receiving Amy's selection of advertisement 120, the interface of City Athletics may display a pop-up window for Amy that says: "You will be re-directed to www.CentralExchange.xyz to select which part of your profile you are willing to share with us, in exchange for this promotion offer." In some embodiments, the media guidance application may give the user an option to cancel this selection and remain at the current interface without setting up or editing her profile. In some other embodiments, the media guidance application may allow the user to set up a profile and share her information with the third party locally, without having to be re-directed to the media guidance application. These and other considerations provide the user with the most control over how her profile information is being used, and with whom the information is shared. In some embodiments, if the media guidance application that generated user interface 100 is the media guidance application, it may prompt the user that she will be taken to another page where she can set up or edit her profile to indicate which portion of her profile information to share with the particular third party that corresponds to the selected advertisement, i.e., advertisement 120.

FIG. 2 depicts an illustrative embodiment of a user interface that allows a user to choose profile characteristics to share with a third party, in accordance with some embodiments of the disclosure. In some embodiments, such as when the optional interface 100 of FIG. 1 is not generated for display, the media guidance application may generate for display user interface 200 of FIG. 2 for the user to choose profile characteristics to share with the third party in exchange for an actual promotion offer. In FIG. 2, like before, user interface 200 can be generated by the media guidance application running at either the central exchange or at the third party itself. If the media guidance application at the central exchange generates user interface 200 for display, the identity of the third party associated with the promotion offer may be identified on user interface 200. For example, Label 204 may identify "City Athletics" as the interested third party if user interface 200 is generated by the media guidance application at the central exchange.

In some embodiments, the third party with which the user agrees to share profile characteristics with is not limited to a commercial entity, but could be a person instead. The media guidance application may record, using an interface similar to user interface 200, the user's preference for profile data sharing for family, friends, and colleagues. For example, Amy (the user) may not mind sharing home addresses and TV watching habits with family, but may prefer to keep these profile data hidden from a particular friend. Amy in this example may also share her social network activities with friends but not colleagues. In this example, the media guidance application may capture Amy's profile-sharing preferences with a member of her family, a friend, a colleague, or the general public based on the discussions of interface 200 below without deviating from the spirit of the present invention. In some embodiments, the user's sharing of profile data with a person may earn her social credits or social points, which the user may use as a form of electronic currency specifically tied to the user, similar to a discount that is customized for the user. In some other embodiments, the user's sharing of profile with a person may only act as a customized firewall to her data, without the possibility of exchanging it for a promotion offer or an electronic currency.

Label 202, similar to label 102 of FIG. 1, identifies the user and indicates that the user has logged-onto her account with the media guidance application. The media guidance application allows the user to log-off the current account by selecting the "LOG OUT" option 206, in the event that the user has finished setting up or editing her profile, or is no longer interested in doing so.

In some embodiments, the media guidance application stratifies the user's profile into a plurality of layers, such as a Basic Layer 210, a Behavioral Layer 220, and other layers such as Layer 230. The layers can be viewed using a horizontal and/or vertical scrollbar to show additional layers that are part of the user's profile. In some embodiments, the Basic Layer 210 may consist of basic demographic information such as Name, Address, Phone Number, Household Contact Information, Spouse Name, Child/Children Names, Gender, Age, etc. The Behavior Layer 220 may consist of video viewing habits, shopping habits, shopping history, sports preferences, etc. In some embodiments, the division of profile characteristics into layers may be adjustable such that a particular profile characteristic may fit into one or more layers. In some embodiments, the level of granularity of the definitions of profile characteristics and layers may be flexible. For example, a profile characteristic may be treated as a layer and sub-divided into further profile characteristics.

Each layer of the user's profile defines a category of her profile information and includes one or more profile characteristics. For example, Basic Layer 210 may include basic demographic information such as profile characteristics "Name," "Address," "Gender," "Age," "Education," etc. In some embodiments, the media guidance application may receive one or more selections of a subset of the profile characteristics from the user, which are those that the user is willing to share with the interested third party corresponding to Label 204. For example, in user interface 200, the user, Amy, has selected "Gender," "Age," and "Education" from a first layer (Basic Layer 210) and "Sports Preference" from a second layer (Behavioral Layer 220) as the subset to share with City Athletics, in exchange for as much of the $5.00 discount as she can receive on the "Baseball" product she had selected in the previous page (i.e., advertisement 120), while not revealing any information to City Athletics about her video viewing history, address, or shopping history.

In this way, the user will retain total control of her profile data and be able to use her data to exchange for promotion offers from businesses that she is interested in. Meanwhile, advertisers or merchants are able to more efficiently allocate resources to target audience users who are more likely to be interested in their products or services.

In some embodiments, the media guidance application further generates label 240 for display on user interface 200. Label 240 indicates, in real time, the actual discount that the user can expect to receive based on her current selections of the subset of profile characteristics. For example, after Amy has selected "Gender," "Age," and "Sports Preference" on user interface 200, label 240 may reflect her total savings as "10% OFF." In order to receive a higher discount, Amy may decide to additionally share her "Education" profile characteristic from Basic Layer 210. In response to receiving her selection of the "Education" profile characteristic, the media guidance application may update label 240 to "15% OFF," which reflects the additional discount that City Athletics is willing to give to Amy as a result of her sharing the additional "Education" profile characteristic.

At the conclusion of the user's selection of profile characteristics to share with the third party, the media guidance application may generate for display a message that confirms the user's intention to share the subset of profile characteristics with the third party. For example, once Amy has selected the gender, age, education, and sports preference profile characteristics to share with City Athletics in exchange for the 15% OFF discount, the media guidance application may generate a message for Amy that indicates: "Are you sure you want to share the following information about you with City Athletics in exchange for your 15% OFF discount?" followed by a table containing Amy's selected subset of profile characteristics, such as Table 1:

TABLE 1

Amy's subset of selected profile characteristics to be shared with City Athletics

| Your Selected Profile Characteristics | Your data |
|---|---|
| Gender | F |
| Age | 23 |
| Education | College |
| Sports Preference | Baseball, Football |

Upon receiving an affirmative response from the user, the media guidance application may proceed to present the selected profile characteristics to the third party. In the above example, the media guidance application may receive an input of "YES" from Amy in response to the message, which indicates her confirmation and consent to the use of her selected profile characteristics by City Athletics, and the media guidance application may proceed to present Amy's selected information to City Athletics. In some embodiments, the media guidance application may provide the user with an opportunity to edit, revise, or delete her selections at this point. For example, Amy may decide that she would rather not share her "Age" information after reviewing the data in Table 1, and will be directed to user interface 200 to revise her selections.

In some embodiments, the media guidance application may allow the user to set up a user account prior to receiving any selection of an advertisement, such as advertisements 110, 120, or 130 of FIG. 1. The media guidance application may pre-populate the user account associated with the user by polling her profile characteristics from a plurality of sources, such as media guidance data source 518 or user profile database 1013 in FIG. 9, as well as social media or any other databases that track and store user profile data.

Additionally, the media guidance application may receive active input from the user herself as she answers questions while setting up her account. For example, after the media guidance application receives input from Amy that sets up her account at www.CentralExchange.xyz, including her name, address, and age, the media guidance application may poll additional information about Amy from the plurality of sources and pre-populate her shopping history, education level, and gender in her profile.

In some embodiments, the media guidance application may infer or deduce additional layers of profile characteristics of the user's based on the profile characteristics that the user has entered, or selected. In some other embodiments, the media guidance application may seek permission from the user to grant access to additional data sources as the user provides access to an existing layer of profile characteristics. For example, based on the user's selection of "Gender" as female and her consent to granting the media guidance application access to the "Gender" profile information, the media guidance application may infer or deduce that the user has additional shopping data from major cosmetic merchant portals. The media guidance application in the above example may request permission from the user to grant it access to her shopping history at Sephora® in exchange for additional potential discounts. In another example, the media guidance application may deduce from the user-entered profile characteristic indicating that the user loves Cola that additional shopping history from the user's offline shopping activities would be useful. In this example, the media guidance application may prompt the user to provide access to her Safeway® royalty card information in order to gain access to her shopping history at the local supermarket. In some embodiments, the inferred, deduced, or additionally acquired layers of profile characteristics may also be included in the user's account with www.CentralExchange.xyz.

Once the user account has been set up, the media guidance application may generate for display, to the user, a message that confirms the information received or inferred. For example, the media guidance application may display a pop-up window to Amy, at the conclusion of her account setup, that says "We have you as a female college graduate in your 20s who loves shopping sports goods and cosmetic products. Is that accurate? These information will be shared with City Athletics." In the above example, the media guidance application requests explicit consent from the user to grant the third party access to data acquired about the user, either deterministically or probabilistically. In another example, the media guidance application may display a pop-up window to Amy at the conclusion of her account setup, and inquire: "We received data indicating that you are a female college graduate in your 20s who loves shopping sporting goods. We also think you might like cosmetic products. Is that accurate? If not, could you correct us?" Alternatively, the media guidance application may generate for display a web page or other type of interface that lists each and every profile characteristics received or inferred about Amy, and require her to "Please verify the following account information we have about you" followed by a display of Amy's profile characteristics that the media guidance application has on file. In this embodiment, the media guidance application provides the user an opportunity to modify and override any inferred profile characteristics of the user's. In some embodiments, the media guidance application may not have sufficient information on the user, and may rely on the subset of profile characteristics selected by the user on user interface 200 to compare against the target audience profile established by the third party. By comparing the subset of user profile characteristics against the target characteristics in the target audience profile, the media guidance application may calculate an instantaneous (real-time) promotion offer for the user, as will be discussed below in relation to FIG. 3 and FIG. 4.

In some embodiments in accordance with the present disclosure, the media guidance application may allow the third party to avoid delays associated with matching a particular user with offline data sets. The media guidance application may achieve this by letting the particular user set up her account ahead of time, as described in the foregoing paragraphs. As soon as the third party is notified of the user's interest in their product or service, the user's identity, detailed profile information as reflected in the profile characteristics she had selected, and total actual discount that should be applied to the user have all been analyzed and presented to the third party. To achieve this ends, in some embodiments, the media guidance application maintains a target audience profile for each third party merchant or advertiser, as well as the rules that they wish to apply in giving out promotion offer based on the degree of matching between a particular user's profile and the target audience profile. This will be illustrated in FIG. 3.

FIG. 3 depicts an illustrative embodiment of an interface that allows a third party to define a target audience profile, in accordance with some embodiments of the disclosure. Interface 300 in FIG. 3 is shown as a web page being hosted by the media guidance application running at the central exchange, as indicated by label 304. However, it is understood that the third party merchant or advertiser can also generate via their respective media guidance application a version of interface 300, or a similar non-webpage interface, such as those described above in relation to interface 100 and interface 200, for display without deviating from the teachings herein. In some embodiments, "LOG OUT" option 306 operates in a similar manner as "LOG OUT" option 206 in FIG. 2. In response to the media guidance application receiving a selection of "LOG OUT" option 306 from the third party, the media guidance application may automatically save all changes to the target audience profile and exit the account of the third party.

In some embodiments, the media guidance application may allow the third party to enter a plurality of target audience characteristics (or "target characteristics") using interface 300 in FIG. 3. The target audience characteristics collectively define a target audience profile for an "ideal user" that the third party wishes to present advertisements, messages, promotion offers, or coupons to. In some embodiments, the third party may define one or more target audience profiles for each advertisement that it wishes to place.

In some embodiments, the target audience of a third party business may be a group of users that are most likely going to be interested in the products and services offered at the third party business. In some other embodiments, the target audience may refer to users who are most responsive to marketing campaigns by the third party, based on historical performance. In some further embodiments, the target audience may refer to users who are willing to share their profile information in exchange for promotion offers from the third party business. In some embodiments, the target characteristics as defined in the target audience profile may be stratified into layers in a similar way that a user's profile characteristics are grouped into layers, as discussed above in relation to FIG. 2.

In interface 300, the media guidance application has received selections of Age 310, Education 330, and Sports Preference 340 from the third party as part of their target audience profile, but did not receive selection of Gender 320 from the third party. For instance, for each of the selected target characteristics Age 310, Education 330, and Sports Preference 340, the media guidance application may receive additional selections from the third party business, City Athletics, that specify the associated values as well as promotion offers of the respective target characteristic. For instance, for target characteristic Age 310, the media guidance application may receive input from City Athletics to choose the 20-30 age group from dropdown menu 312 and define a 2% discount from dropdown menu 314 for any user that belongs to this age group and is also willing to share her data with City Athletics. Similarly, for Sports Preference 340, the media guidance application may receive input from City Athletics to select from dropdown menus 342 and 344, which define the target audience profile to include users who love baseball, and to extend a half percent discount towards users who fit in that category and are willing to share their profile data.

In the example illustrated in interface 300, the target characteristic Gender 320 is not selected by City Athletics, therefore its corresponding value and discount dropdown menus 322 and 324 are not selected. In some embodiments, an unselected target characteristic may have its corresponding value and discount dropdown menus greyed out, so as to prevent accidental unwanted selections.

In some embodiments, the media guidance application may allow for additional target characteristics to be added by receiving a selection of button 350 to add another row to the interface. In some embodiments, the additional row will contain different target characteristics from those already displayed in the interface. In some other embodiments, the additional row may include the same target characteristics as the existing ones and be taken into consideration following some common logical operators. For example, City Athletics may add another row of "Sports Preference" target characteristic in addition to Sports Preference 340, and may define the corresponding value of the additional now of "sports preference" to be "Football" followed by an "AND" logical operator. In this way, the ideal user profile would contain the target characteristic of a sports preference of both baseball and football. Consequently, a user can enjoy the corresponding promotion offer (e.g., half percent OFF) if her sports preference matches with both target characteristics.

In some embodiments, the target characteristics as entered in interface 300 collectively define the hypothetical profile of an ideal user. The media guidance application may tally up the individual discount value associated with each selected target characteristic, and compute an optimal promotion offer attainable by an individual user. For example, for City Athletics' ideal target audience as shown below in Table 1, the total discount attainable by one such ideal user is 3%. Accordingly, the optimal promotion offer may be 3%. In this example, the initial advertisement that Amy had selected, such as advertisements 110, 120, and 130 of FIG. 1, may have shown 3% as the optimal promotion offer.

In some embodiments, the optimal promotion offer is not defined as the highest discount attainable by an ideal user, as discussed above. Instead, the optimal promotion offer in the alternative embodiments may be defined as the highest amount of discount attainable by the user who viewed the initial advertisement. For example, for Amy, who has the profile characteristics shown in Table 1 and lives in a rural area, the media guidance application may determine that she matches three out of the four target characteristics as defined in Table 2 by City Athletics. The fact that Amy lives in a rural area means she does not match the "Address" target

TABLE 2

City Athletics' target audience profile

| Target Characteristic | Target Value | Promotion offer |
| --- | --- | --- |
| Age | 20-30 | 2% |
| Address | Urban | 0.2% |
| Education | College and above | 0.3% |
| Sports Preference | Baseball | 0.5% | characteristic, regardless of whether or not she is willing to share that information with City Athletics. Accordingly, the optimal promotion offer as indicated on advertisements 110, 120, and 130 may be 2.8%, rather than 3%, under the alternative embodiments.

Although user interface 200 of FIG. 2 and interface 300 of FIG. 3 illustrate various profile or target characteristics using checkboxes and dropdown menus, this is understood to be illustrative in nature and non-limiting. Various other user interface elements, including dial buttons, text boxes, and selection menus can be used in place of any of the above-described elements without deviating from the teachings of the present disclosure. For example, instead of selecting a promotion offer associated with a particular target characteristic, the third party may manually enter a discount value in a text box to be associated with the particular target characteristic. Furthermore, in some embodiments, the third party may choose to define the amount of promotion offer associated with a particular target characteristic as a dynamic function by using a script language processor implemented on interface 300. In some further embodiments, the third party may define the promotion offer using an equation. For instance, instead of defining a 2% discount for a matching user who shares her age information, City Athletics may specify that a user who fits both the "Age" and "Education" characteristics will enjoy a discount of 2% off, whereas for a user who only fits the "Age" characteristic, the discount will only be $2.00 off (subject to a 1% discount cap).

As illustrated in relation to FIG. 2, the media guidance application may receive selections from the user to share the subset of profile characteristics with the third party, in response to determining a match between the user's profile characteristics and the third party's target characteristics. Based on the subset of profile characteristics, the media guidance application may calculate an actual promotion offer for the user. In some embodiments, the actual promotion offer calculated from the subset may not exceed the optimal promotion offer for the user. For example, in the hypothetical situation as outlined in Table 3, Amy's profile includes profile characteristics such as age, address, education level, gender, and sports preference. Out of these profile characteristics, Amy has chosen to share her age, education, and gender characteristics with City Athletics (C.A. for short), as indicated by the third column of Table 3. The target audience profile as specified by City Athletics is listed in the last column along with the promotion offer associated with each target characteristic.

Consistent with prior definitions and at least one embodiment, the optimal promotion offer for Amy is 2.8%, as calculated based on the degree of matching between Amy's profile characteristics and City Athletics' target characteristics. This is the optimal promotion offer that the media guidance application will generate for display for Amy when she visits user interface 100 of FIG. 1. For example, advertisement 120 may display a message that indicates "Would you consider buying [product] for up to 2.8% discount?"

TABLE 3

| Characteristics | Amy's Profile | Amy's Subset | C.A.'s Target |
|---|---|---|---|
| Age | 23 | x | 20-30 (2%) |
| Address | Rural |  | Urban (0.2%) |
| Education | College | x | College or above (0.3%) |
| Gender | F | x |  |
| Sports Preference | Baseball, Football |  | Baseball (0.5%) |

After Amy has selected advertisement 120, she may select the subset of her profile characteristics—Age, Education, and Gender—to share with City Athletics, in accordance with the hypothetical scenario in Table 3. This subset, however, only matches with two of City Athletics' target characteristics, i.e., Age and Education. Even though Amy has included Gender as a profile characteristic to share with City Athletics, City Athletics is not interested in that information and does not assign any discount value to be associated with gender, as shown by the unchecked box representing Gender 320 of FIG. 3. Accordingly, the actual promotion offer that Amy may receive from City Athletics is 2.3% (calculated based on "Age" and "Education" only), which is not greater than the optimal promotion offer of 2.8%.

The embodiments above are generally directed to the third party defining an optimal promotion offer as the starting point. However, it is contemplated that a minimum base discount model can be used in place of the optimal promotion offer model without deviating from the spirit of the present disclosure. In embodiments where a minimum base discount is used as the starting point, the third party will define a starting promotion offer for any user interested in sharing her profile information. By matching a particular user's profile characteristics with the target audience profile, the media guidance application may increase the base promotion offer by a percentage as calculated based on the degree of matching. For example, City Athletics is willing to offer a 2% promotion offer to any user who is willing to share her profile. If the media guidance application compute a percentage value based on the degree of matching between Amy's shared subset of profile characteristics with the third-party-defined target characteristics, e.g., 46.7%, the media guidance application may derive the actual promotion offer that City Athletics is willing to give Amy as 4.3% off (2% divided by 46.7%).

Figure 4:
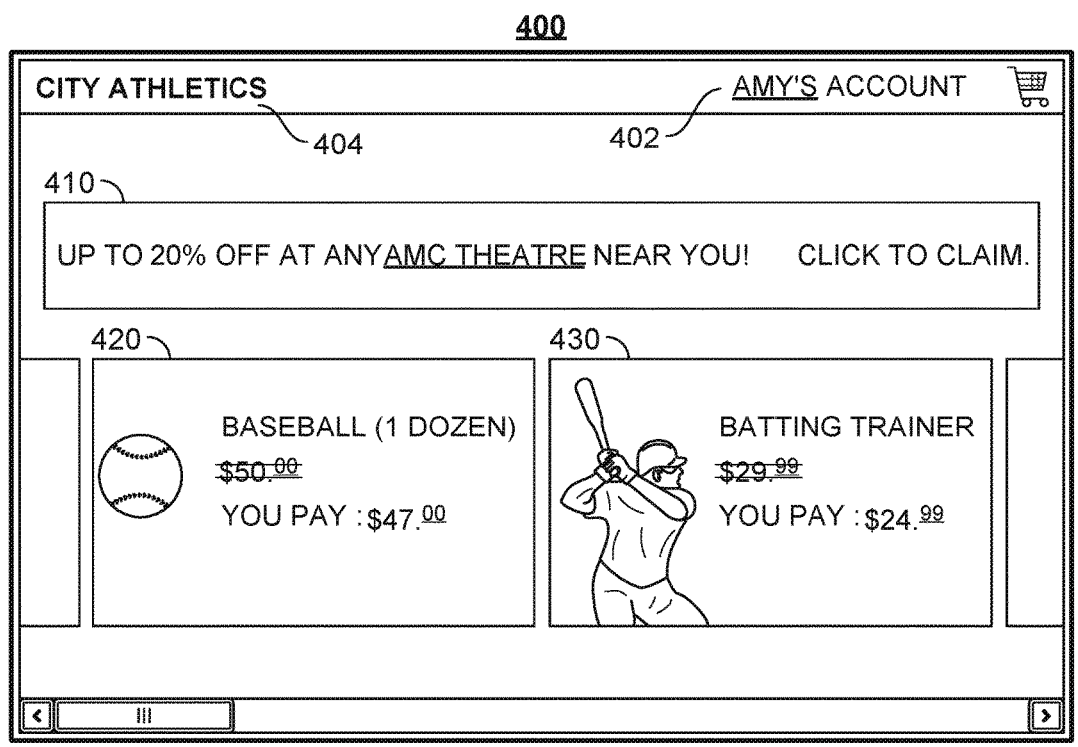
FIG. 4 depicts an illustrative embodiment of a user interface that informs a user about an actual promotion offer from a third party, in accordance with some embodiments of the disclosure.

Regardless of the starting point, the actual promotion offer may, in some embodiments, be displayed in one or more advertisements on an user interface, such as that of FIG. 4. In some embodiments, after the third party has set up a target audience profile (such as that of FIG. 3) and the user has selected a subset of profile characteristics to share with the third party (such as that of FIG. 2), the user may be prompted: "Now you will be re-directed to the Third Party's web site to apply your actual discount!" and be re-directed to user interface 400 as shown in FIG. 4.

FIG. 4 depicts an illustrative embodiment of a user interface that informs a user about an actual promotion offer from a third party, in accordance with some embodiments of the disclosure. User interface 400 as shown in FIG. 4 may be substantially similar to user interface 100 shown in FIG. 1, and replaces the optimal promotion offers (e.g., "Your discount: up to $5.00 off") with actual promotion offers associated with the user (e.g., "You pay $47.00"). For example, advertisements 420 and 430 may correspond to updated versions of advertisements 120 and 130, respectively. As previously discussed in relation to advertisement 110, in some embodiments, advertisement 410 may reflect products or services unrelated to the third party business and therefore may remain unchanged after the user has submitted her subset of profile characteristics to share with the third party. For example, user interface 400 is generated as a web page of City Athletics (or a television display), and advertisements 420 and 430 are substantially related to the products or services offered by City Athletics. Advertisement 410, however, may be unrelated to City Athletics and therefore is not updated from advertisement 110 when Amy has only chosen to share some of her profile characteristics with City Athletics, on user interface 200 of FIG. 2. Lastly, labels 402 and 404 largely correspond to labels 102 and 104 of FIG. 1, which indicate the user's identity and the third party's identity, respectively.

In some embodiments, in response to receiving a selection of an updated advertisement from the user, the media guidance application may allow the user to purchase the product or service at the actual discount, as indicated on the updated advertisement, which is specific to the user. In some embodiments, the communication of the actual promotion offer may be carried out in javascript, HTML, or any suitable interface language. Each and every embodiment of the present disclosure can be implemented on the content delivery systems as discussed in relation to FIG. 9 and FIG. 10 below.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "equipment device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, a third party business may interact with a remote server via a similar equipment device, which may be termed "third party equipment device," or "equipment device" in general. For simplicity, an "equipment device" may be used by either an individual user or a third party business, such as a third party merchant or advertiser, so long as the manner of interaction conforms to the capabilities of the generic equipment device as discussed below in relation to FIG. 9. In some embodiments, the equipment device may have a front facing screen and a rear facing screen, multiple front screens, or multiple angled screens. In some embodiments, the equipment device may have a front facing camera and/or a rear facing camera. On these equipment devices, users may be able to navigate among and locate the same content available through a television. Consequently, media guidance may be available on these devices, as well. The guidance provided may be for content available only through a television, for content available only through one or more of other types of equipment devices, or for content available both through a television and one or more of the other types of equipment devices. The media guidance applications may be provided as on-line applications (i.e., provided on a web-site), or as stand-alone applications or clients on equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

As previously discussed, FIGS. 1-4 show illustrative interfaces displayed on display screens that may be used to provide media guidance data. The display screens shown in FIGS. 1-4 may be implemented on any suitable user or third party business equipment device or platform. While the displays of FIGS. 1-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

In particular, advertisements 110, 120, 130, 410, 420, and 430 may be selectable and provide further information about content, provide information about a product or a service, enable purchasing of content, a product, or a service, provide content relating to the advertisement, etc. As discussed herein, Advertisements 110, 120, 130, 410, 420, and 430 may be targeted based on a user's profile/preferences, monitored user activity, the type of display provided, or on other suitable targeted advertisement bases.

FIGS. 5-8 show illustrative display screens that may be used to provide media guidance data. The display screens shown in FIGS. 5-8 may be implemented on any suitable user equipment device or platform. While the displays of FIGS. 5-8 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

Figure 5:
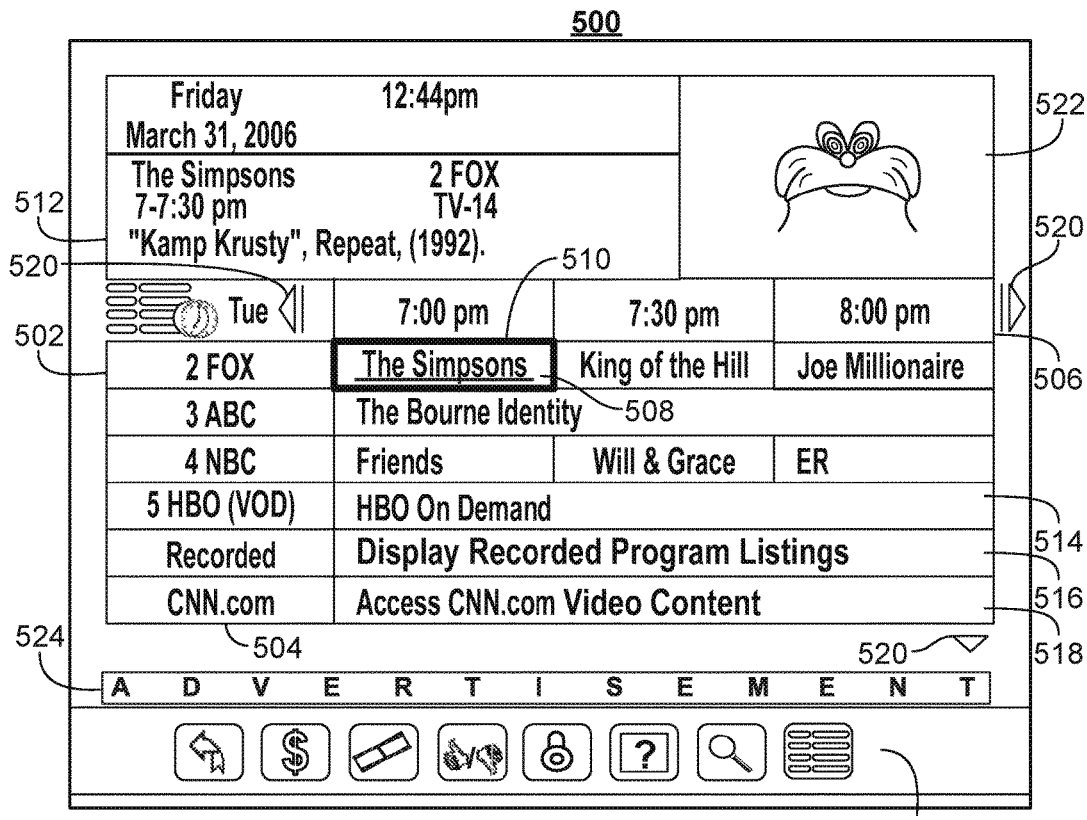
FIG. 5 depicts an illustrative embodiment of a display screen that may be used to provide media guidance application listings and other media guidance information, in accordance with some embodiments of the disclosure.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 524 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 524 may also be for products or services related or unrelated to the content displayed in grid 102. Advertisement 524 may be selectable and provide further information about content, provide information about a product or a service, enable purchasing of content, a product, or a service, provide content relating to the advertisement, etc. Advertisement 524 may be targeted based on a user's profile/preferences, monitored user activity, the type of display provided, or on other suitable targeted advertisement bases.

While Advertisements 110, 120, 130, 410, 420, and 430 are shown as rectangular or banner shaped, the advertisements may be provided in any suitable size, shape, and location in a guidance application display. For example, the advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.alltivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 10. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 6:
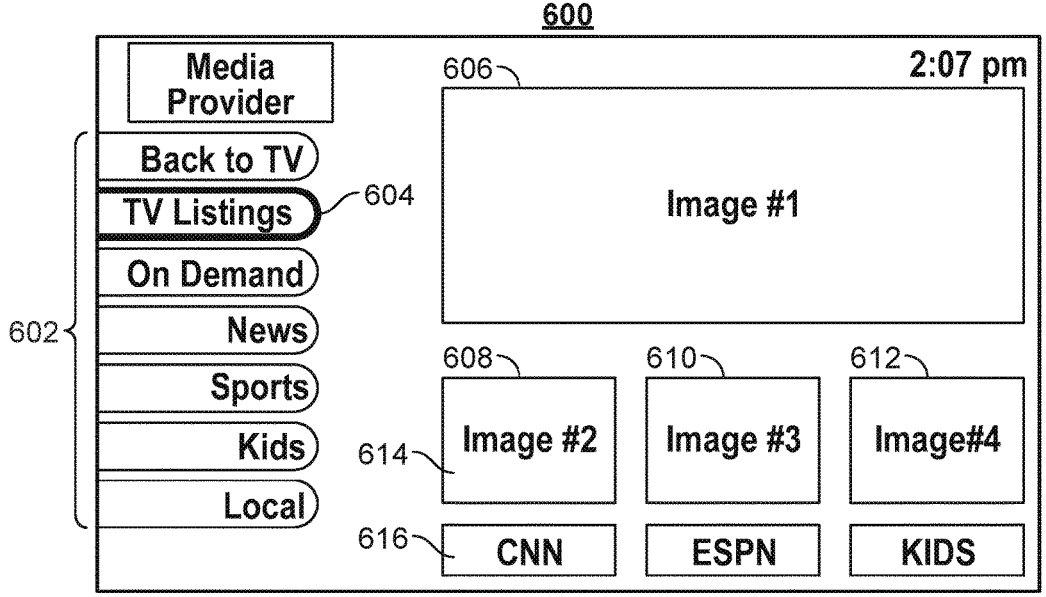
FIG. 6 depicts another illustrative embodiment of a display screen that may be used to provide media guidance application listings, in accordance with some embodiments of the disclosure.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 7:
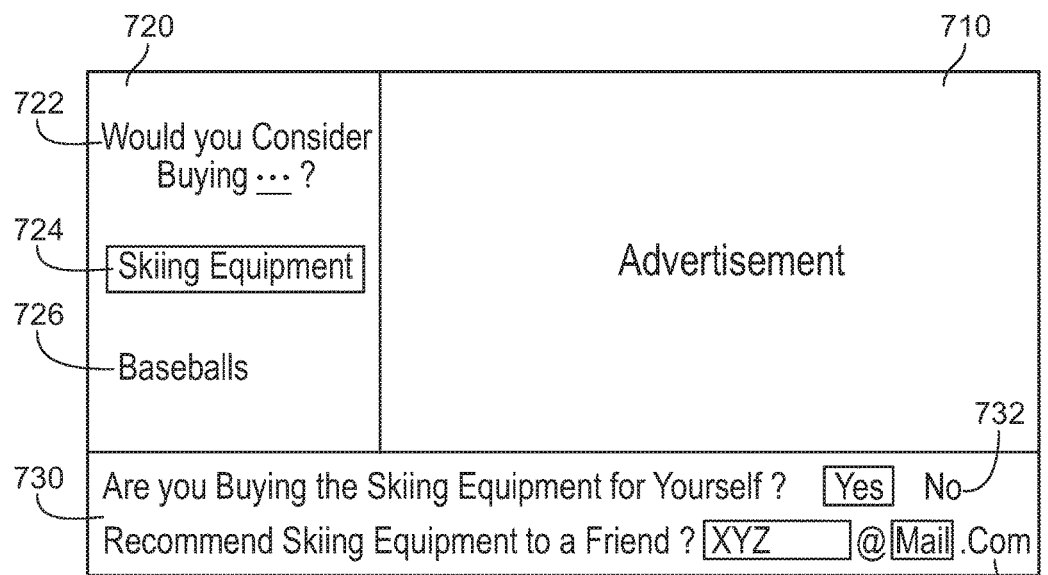
FIG. 7 depicts an illustrative embodiment of a display screen that presents an advertisement and other interactive elements as part of a media guidance application, in accordance with some embodiments of the disclosure.

FIG. 7 depicts an illustrative embodiment of a display screen that presents an advertisement and other interactive elements as part of a media guidance application, in accordance with some embodiments of the disclosure. The media guidance application may, instead of displaying advertisements 110, 120, 130, or 524, generate advertisement 710 for display in a portion of the screen. The media guidance application may also generate advertisement 710 for display during a commercial break of a media asset, such as during a movie on-demand. In some embodiments in accordance with FIG. 7, the media guidance application may generate interactive elements on areas of the display that are not occupied by advertisement 710, such as interactive regions 720 and 730. The interactive elements correspond to any icons, options, hyperlinks, or other interactive means that are responsive to user actions, and may behave in a similar manner as selectable option 140, options regions 526, or mosaic panels 608, 610, and 612, among other similar elements. The media guidance application may present notification messages or queries in interactive regions 720 and 730, including the notification messages and queries that are previously discussed in relation to FIGS. 1-4 and FIGS. 11-15 below.

For example, as the viewer is watching advertisement 710 (e.g., an advertisement on ski products) during a commercial break, the media guidance application may present a notification message that includes question 722 "Would you consider buying [product]?" within interactive area 720. As illustrated in relation to FIGS. 1-4, the media guidance application may present two options based on the user's profile information that is publicly available to a particular merchant: option 724 that reads "skiing equipment" and option 726 that reads "baseballs." The media guidance application may further display a navigational cursor to allow the user to highlight option 724 to indicate his or her preference for purchases at the moment.

Following this example, the media guidance application may, upon receiving the user's selection of option 724, generate additional queries in interactive area 730 for the user to answer additional questions. As discussed above in relation to FIGS. 1-6, the media guidance application presents queries 732 and 734 in order to obtain additional information that the merchant previously had no access to. In the exemplary display screen of FIG. 7, the media guidance application further presents queries to the user to inquire whether she is buying the skiing equipment for herself, and whether she would recommend the skiing equipment to a friend. Here, the media guidance application presents interactive elements, such as a highlighted cursor, a textbox, a check box, or a voice transcription service, for the user to respond to, in order to obtain additional information about the user. At the conclusion of the user's interactions with the interactive areas, the media guidance application may expand advertisement 710 to full-screen (thus occupying regions 720 and 730) and allow the user to continue viewing advertisement 710 presented during the commercial break.

Figure 8:
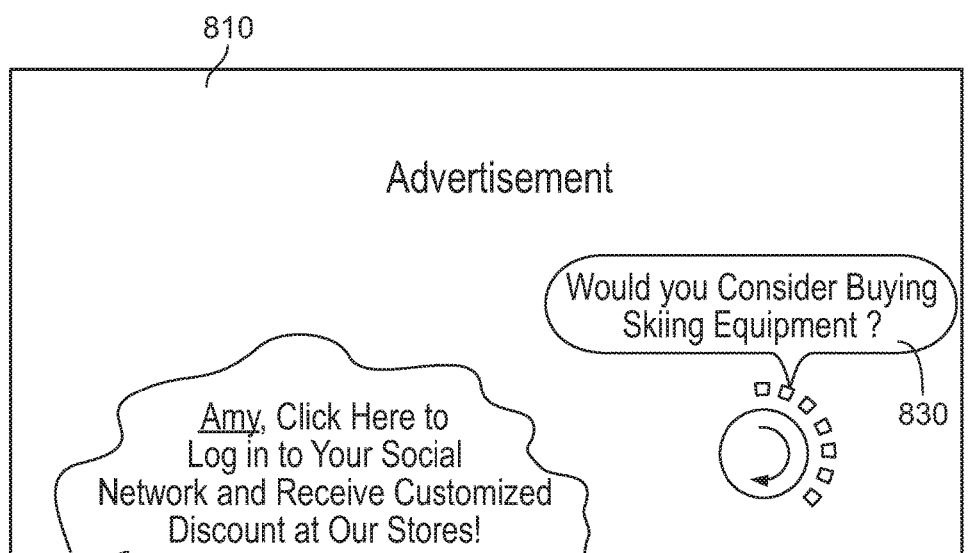
FIG. 8 depicts another illustrative embodiment of a display screen that presents an advertisement and other interactive elements as part of a media guidance application, in accordance with some embodiments of the disclosure.

FIG. 8 depicts another illustrative embodiment of a display screen that presents an advertisement and other interactive elements as part of a media guidance application, in accordance with some embodiments of the disclosure. In FIG. 8, rather than displaying the advertisement in a limited area of the screen, the media guidance application generates advertisement 810 (e.g., an advertisement on ski products) in full-screen and the interactive elements 820 and 830 as overlays on top of advertisement 810. For example, the media guidance application may generate interactive element 820 as a notification message much like those described in relation to FIGS. 1-4. Upon receiving the user's selection of interactive element 820, the media guidance application may direct the user to a log-in page of a third-party social network site in order to obtain information about the user that were not previously known by the merchant, and to present discount offers accordingly. In the exemplary display screen of FIG. 8, the media guidance application displays interactive element 830 as a rotary dial for the user to select a query question to respond to. In response to receiving the user's selection and input of her information, the media guidance application may hide interactive element 830 to allow the user to continue viewing advertisement 810 during the commercial break.

FIGS. 7 and 8 could, in some embodiments, act as a point of entry for the systems and methods described herein to operate from, in order to obtain additional information about the user and to calculate optimal offers for the user. For instance, instead of visiting a web page, such as those described in FIG. 1, as a starting point for the media guidance application to begin querying information about the user, the user may interact with a regular television guide and be presented with questions and queries such as interactive regions 720 and 730, and interactive elements 820 and 830. At the conclusion of these interactions, or at the conclusion of the displayed advertisement, the media guidance application may present an optimal discount offer to the user for the product that the user is most likely to buy based on the new information obtained in the interim.

Figure 9:
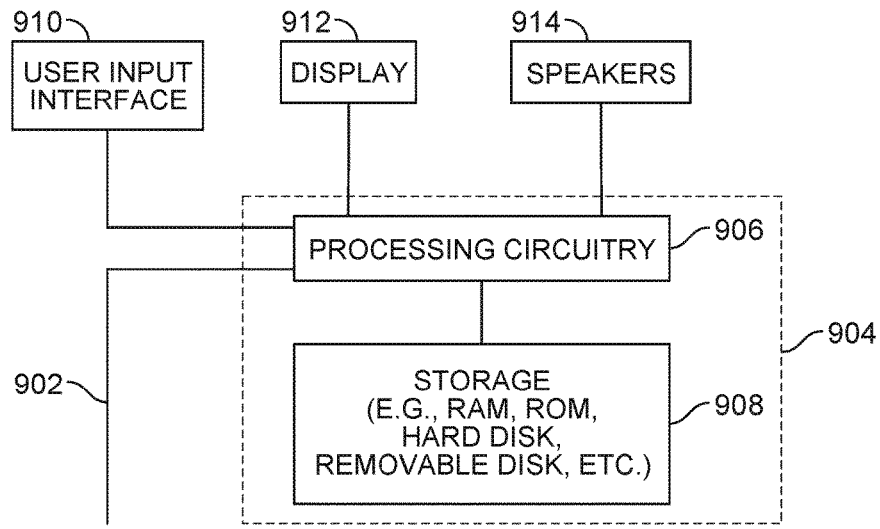
FIG. 9 is a block diagram of an illustrative device in accordance with some embodiments of the disclosure.

Users and third party businesses may access content and the media guidance application (and its display screens described above and below) from one or more of their equipment devices. FIG. 9 shows a generalized embodiment of illustrative device 700—which may be used by the users or the third party businesses, or both. More specific implementations of equipment devices, such as user television equipment 1002, user computer equipment 1004, wireless user communications device 1006, merchant 1017, or advertisement provider 1019 are discussed below in connection with FIG. 10. Device 700 may receive content and data via input/output (hereinafter "I/O") path 902. I/O path 902 may provide content (e.g., broadcast programming, on-demand programming, Internet content, content available over a local area network (LAN) or wide area network (WAN), and/or other content) and data to control circuitry 904, which includes processing circuitry 906 and storage 908. Control circuitry 904 may be used to send and receive commands, requests, and other suitable data using I/O path 902. I/O path 902 may connect control circuitry 904 (and specifically processing circuitry 906) to one or more communications paths (described below). I/O functions may be provided by one or more of these communications paths, but are shown as a single path in FIG. 9 to avoid overcomplicating the drawing.

Control circuitry 904 may be based on any suitable processing circuitry such as processing circuitry 906. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 904 executes instructions for a media guidance application stored in memory (i.e., storage 908). Specifically, control circuitry 904 may be instructed by the media guidance application to perform the functions discussed above and below. For example, the media guidance application may provide instructions to control circuitry 904 to generate the media guidance displays. In some implementations, any action performed by the control circuitry 904 may be based on instructions received from the media guidance application.

In client-server based embodiments, control circuitry 904 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 10). In addition, communications circuitry may include circuitry that enables peer-to-peer communication of user equipment devices, or communication of user equipment devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as media guidance data described above. Nonvolatile memory may also be used (e.g., to launch a boot-up routine and other instructions). Cloud-based storage, described in relation to FIG. 10, may be used to supplement storage 908 or instead of storage 908.

Control circuitry 904 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 904 may also include scaler circuitry for upconverting and downconverting content into the preferred output format of the device 700. Circuitry 904 may also include digital-to-analog converter circuitry and analog-to-digital converter circuitry for converting between digital and analog signals. The tuning and encoding circuitry may be used by the equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from device 700, the tuning and encoding circuitry (including multiple tuners) may be associated with storage 908.

A user may send instructions to control circuitry 904 using user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of device 700. For example, display 912 may be a touchscreen or touch-sensitive display. In such circumstances, user input interface 910 may be integrated with or combined with display 912. Display 912 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 912 may be HDTV-capable. In some embodiments, display 912 may be a 3D display, and the interactive media guidance application and any suitable content may be displayed in 3D. A video card or graphics card may generate the output to the display 912. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 904. The video card may be integrated with the control circuitry 904. Speakers 914 may be provided as integrated with other elements of device 700 or may be stand-alone units. The audio component of videos and other content displayed on display 912 may be played through speakers 914. In some embodiments, the audio may be distributed to a receiver (not shown), which processes and outputs the audio via speakers 914.

The guidance application may be implemented using any suitable architecture. For example, it may be a stand-alone application wholly-implemented on device 700. In such an approach, instructions of the application are stored locally (e.g., in storage 908), and data for use by the application is downloaded on a periodic basis (e.g., from an out-of-band feed, from an Internet resource, or using another suitable approach). Control circuitry 904 may retrieve instructions of the application from storage 908 and process the instructions to generate any of the displays discussed herein. Based on the processed instructions, control circuitry 904 may determine what action to perform when input is received from input interface 910. For example, movement of a cursor on a display up/down may be indicated by the processed instructions when input interface 910 indicates that an up/down button was selected.

In some embodiments, the media guidance application is a client-server based application. Data for use by a thick or thin client implemented on device 700 is retrieved on-demand by issuing requests to a server remote to the device 700. In one example of a client-server based guidance application, control circuitry 904 runs a web browser that interprets web pages provided by a remote server. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on device 700. This way, the processing of the instructions is performed remotely by the server while the resulting displays are provided locally on device 700. Device 700 may receive inputs from the user via input interface 910 and transmit those inputs to the remote server for processing and generating the corresponding displays. For example, device 700 may transmit a communication to the remote server indicating that an up/down button was selected via input interface 910. The remote server may process instructions in accordance with that input and generate a display of the application corresponding to the input (e.g., a display that moves a cursor up/down). The generated display is then transmitted to device 700 for presentation to the user.

In some embodiments, the media guidance application is downloaded and interpreted or otherwise run by an interpreter or virtual machine (run by control circuitry 904). In some embodiments, the guidance application may be encoded in the ETV Binary Interchange Format (EBIF), received by control circuitry 904 as part of a suitable feed, and interpreted by a user agent running on control circuitry 904. For example, the guidance application may be an EBIF application. In some embodiments, the guidance application may be defined by a series of JAVA-based files that are received and run by a local virtual machine or other suitable middleware executed by control circuitry 904. In some of such embodiments (e.g., those employing MPEG-2 or other digital media encoding schemes), the guidance application may be, for example, encoded and transmitted in an MPEG-2 object carousel with the MPEG audio and video packets of a program.

Device 700 of FIG. 9 can be implemented in system 800 of FIG. 10 as user television equipment 1002, user computer equipment 1004, wireless user communications device 1006, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 9 may not be classified solely as user television equipment 1002, user computer equipment 1004, or a wireless user communications device 1006. For example, user television equipment 1002 may, like some user computer equipment 1004, be Internet-enabled allowing for access to Internet content, while user computer equipment 1004 may, like some user television equipment 1002, include a tuner allowing for access to television programming. The media guidance application may have the same layout on various different types of user equipment or may be tailored to the display capabilities of the user equipment. For example, on user computer equipment 1004, the guidance application may be provided as a web site accessed by a web browser. In another example, the guidance application may be scaled down for wireless user communications device 1006.

In system 800, there is typically more than one of each type of user equipment device but only one of each is shown in FIG. 10 to avoid overcomplicating the drawing. In addition, each user may utilize more than one type of user equipment device and also more than one of each type of user equipment device.

In some embodiments, a user equipment device (e.g., user television equipment 1002, user computer equipment 1004, wireless user communications device 1006) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.alltivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1014. Namely, user television equipment 1002, user computer equipment 1004, and wireless user communications device 1006 are coupled to communications network 1014 via communications paths 1008, 1010, and 1012, respectively. Communications network 1014 may be one or more networks including the Internet, a mobile phone network, mobile voice or data network (e.g., a 4G or LTE network), cable network, public switched telephone network, or other types of communications network or combinations of communications networks. Paths 1008, 1010, and 1012 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1012 is drawn with dotted lines to indicate that in the exemplary embodiment shown in FIG. 10 it is a wireless path and paths 1008 and 1010 are drawn as solid lines to indicate they are wired paths (although these paths may be wireless paths, if desired). Communications with the user equipment devices may be provided by one or more of these communications paths, but are shown as a single path in FIG. 10 to avoid overcomplicating the drawing.

Although communications paths are not drawn between user equipment devices, these devices may communicate directly with each other via communication paths, such as those described above in connection with paths 1008, 1010, and 1012, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1014.

System 800 includes user profile database 1013, central exchange 1015, content source 1016, merchant 1017, media guidance data source 1018, and advertisement provider 1019 coupled to communications network 1014 via communication paths. The communication paths used to connect the sources, database, and other entities (hereinafter "source entities") may include any of the communication paths described above in connection with paths 1008, 1010, and 1012. Communications with the above source entities may be exchanged over one or more communications paths, but are shown as a single path in FIG. 10 to avoid overcomplicating the drawing. In addition, there may be more than one of each of the source entities as mentioned above, but only one of each is shown in FIG. 10 to avoid overcomplicating the drawing. (The different types of each of these sources are discussed below.) If desired, any two or more of these source entities may be integrated as one source device. Although communications between the source entities with user equipment devices 1002, 1004, and 1006 are shown as through communications network 1014, in some embodiments, the source entities may communicate directly with user equipment devices 1002, 1004, and 1006 via communication paths (not shown) such as those described above in connection with paths 1008, 1010, and 1012.

User profile database 1013 may include one or more centralized servers that aggregate, store, and distribute profile data related to individual users, or consumers. For example, profile data of users of media guidance application may be collected from various interactive media guidance application and analyzed by any data aggregation and machine learning algorithms at a central server. In some embodiments, user profile data base 1013 may be physically located at the same place as, or is part of, media content source 1016 or media guidance data source 1018, or any of the plurality of sources and databases as shown in FIG. 10. As discussed in relation to FIGS. 1-8, the account data of a particular user, such as Amy, may be stored at user profile database 1013 and be retrieved by processing circuitry 906 of a user equipment or by similar processing circuitry of a central exchange, such as central exchange 1015. A media guidance application at central exchange 1015, as defined previously in relation to FIGS. 1-8, may broker discount deals between a user and a third party advertiser or merchant. In some embodiments, central exchange 1015 may be physically located at the same place as, or is part of, media content source 1016 or media guidance data source 1018, or any other sources or databases described in FIG. 10. In some embodiments, media guidance application may cause control circuitry 904 to generate for display the various interfaces as shown in FIGS. 1-8, as well as to receive, store, or process inputs from a user or a third party via the Internet. In some embodiments, user profile database 1013 and/or central exchange 1015 may be integrated into either one or both of media content source 1016 and media guidance data source 1018 in order to provide an integrated media access experience for users and the third parties.

In some embodiments, the central exchange 1015 may have access to profile data of users on user profile database 1013 for which the users have granted explicit permissions. In some other embodiments, the central exchange may be informed of the existence of user profile of some other users who have not granted central exchange 1015 access, without having actual access to such profiles. In these embodiments, central exchange 1015 may nonetheless request permission from the users who have not granted it access. When access is eventually granted, central exchange 1015 may then access and compile profile data of these users.

Content source 1016 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1016 may be the originator of content (e.g., a television broadcaster, a Webcast provider, etc.) or may not be the originator of content (e.g., an on-demand content provider, an Internet provider of content of broadcast programs for downloading, etc.). Content source 1016 may include cable sources, satellite providers, on-demand providers, Internet providers, over-the-top content providers, or other providers of content. Content source 1016 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Merchant 1017 and advertisement provider 1019 may be remote servers of a third party merchant or advertiser that generate targeted advertisements for users. In some embodiments, media guidance applications running at merchant 1017 and/or advertisement provider 1019 may generate advertisements 110, 120, and 130 for display on user interface 100 of FIG. 1. In some embodiments, the media guidance applications running at merchant 1017 and/or advertisement provider 1019 may provide a target audience profile, define algorithms for targeting users, and provide maximum, minimum, or actual promotion offers in accordance with the disclosure of FIGS. 1-8. In some embodiments, merchant 1017 and/or advertisement provider 1019 may be physically located at the same place as media content source 1016 or media guidance data source 1018, or may be integrated into media content source 1016 or media guidance data source 1018 in order to provide users a more integrated experience.

Media guidance data source 1018 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1018 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1018 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1018 may provide user equipment devices 1002, 1004, and 1006 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 908, and executed by control circuitry 904 of a device 700. In some embodiments, media guidance applications may be client-server applications where only a client application resides on the user equipment device, and server application resides on a remote server. For example, media guidance applications may be implemented partially as a client application on control circuitry 904 of device 700 and partially on a remote server as a server application (e.g., media guidance data source 1018) running on control circuitry of the remote server. When executed by control circuitry of the remote server (such as media guidance data source 1018), the media guidance application may instruct the control circuitry to generate the guidance application displays and transmit the generated displays to the user equipment devices. The server application may instruct the control circuitry of the media guidance data source 1018 to transmit data for storage on the user equipment. The client application may instruct control circuitry of the receiving user equipment to generate the guidance application displays.

Content and/or media guidance data delivered to user equipment devices 1002, 1004, and 1006 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 10.

In one approach, user equipment devices may communicate with each other within a home network. User equipment devices can communicate with each other directly via short-range point-to-point communication schemes described above, via indirect paths through a hub or other similar device provided on a home network, or via communications network 1014. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a merchant portal via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1016 to access content. Specifically, within a home, users of user television equipment 1002 and user computer equipment 1004 may access the media guidance application to navigate among and locate desirable content. Users may also access the media guidance application outside of the home using wireless user communications devices 1006 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1014. These cloud resources may include one or more content sources 1016 and one or more media guidance data sources 1018. In addition or in the alternative, the remote computing sites may include other user equipment devices, such as user television equipment 1002, user computer equipment 1004, and wireless user communications device 1006. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1004 or wireless user communications device 1006 having content capture feature. Alternatively, the user can first transfer the content to a user equipment device, such as user computer equipment 1004. The user equipment device storing the content uploads the content to the cloud using a data transmission service on communications network 1014. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry 906 described in relation to FIG. 9.

FIG. 9 presents an illustrative flowchart of a process for allowing a user to grant or deny a third party access to different portions of the user's profile characteristics, in accordance with some embodiments of the disclosure. In some embodiments, the process may be encoded on to non-transitory storage medium (e.g., storage device 908) as a set of instructions to be decoded and executed by processing circuitry (e.g., processing circuitry 906). Processing circuitry may in turn provide instructions to other sub-circuits contained within control circuitry 904, such as the tuning, video generating, encoding, decoding, encrypting, decrypting, scaling, analog/digital conversion circuitry, and the like.

Figure 11:
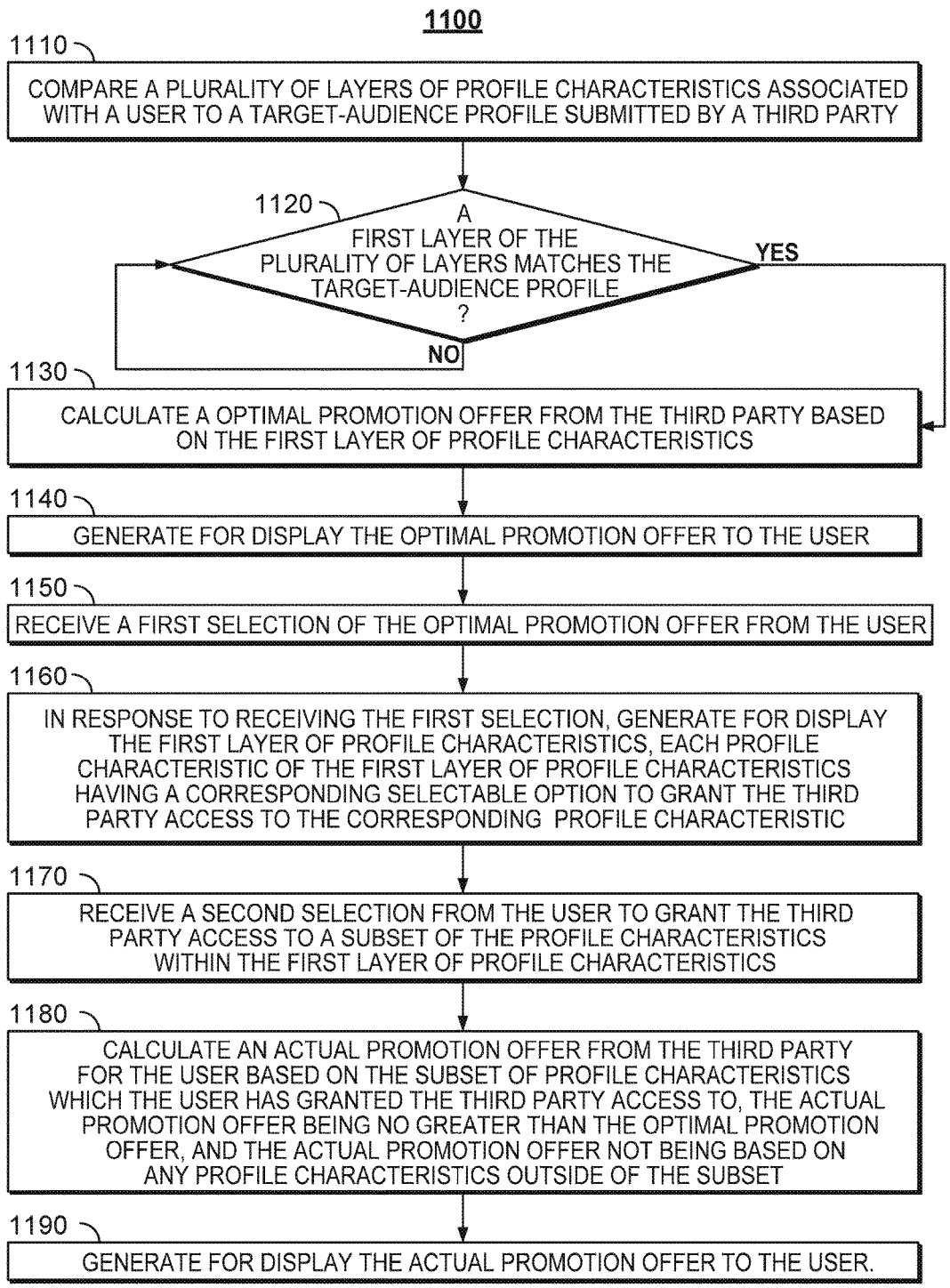
FIG. 11 depicts an illustrative flowchart of a process for allowing a user to grant or deny a third party access to different portions of the user's profile characteristics, in accordance with some embodiments of the disclosure.

In FIG. 11, at 1110, a media guidance application may cause control circuitry of a system, such as control circuitry 904 located at central exchange 1015 or third party merchant 1017, to compare a plurality of layers of profile characteristics associated with a user to a target-audience profile submitted by a third party. In some embodiments, the third party may be merchant 1017 or advertisement provider 1019, and may submit the target-audience profile, such as those defined in interface 300 of FIG. 3, using a third party device located at merchant 1017 or advertisement provider 1019, which may be similar to device 700 in structure.

At 1120, the media guidance application may cause control circuitry 904 to determine whether a first layer of the plurality of layers matches the target-audience profile. In response to determining that the first layer does not match the target-audience profile, the media guidance application may cause control circuitry 904 to loop at 1120. In some embodiments, the media guidance application may have insufficient information about the user at the onset of process 1100, and may make 1110 and 1120 optional and may perform them at a later opportunity. Instead, in such embodiments, the media guidance application may cause control circuitry 904 to generate for display an interface that allows the user the enter her profile characteristics in exchange for discount opportunities, such as the interface at 1160, as will be discussed below.

At 1130, in response to determining that the first layer matches the target-audience profile, the media guidance application may cause control circuitry 904 to calculate an optimal promotion offer from the third party based on the first layer of profile characteristics, such as a Basic Layer 210 as shown in FIG. 2. At 1140, the media guidance application may cause control circuitry 904 to generate for display the optimal promotion offer to the user, such as the optimal promotion offer displayed in advertisement 120 of FIG. 1.

At 1150, the media guidance application may cause control circuitry 904 to receive a first selection of the optimal promotion offer from the user, such as advertisement 120. At 1160, the media guidance application may cause control circuitry 904 to, in response to receiving the first selection of the optimal promotion offer, generate for display the first layer of profile characteristics, each profile characteristic of the first layer having a corresponding selectable option to grant the third party, such as merchant 1017, access to the corresponding profile characteristic of the user.

At 1170, the media guidance application may cause control circuitry 904 to receive a second selection from the user to grant the third party access to a subset of the profile characteristics within the first layer, such as the profile characteristics selected on user interface 200 of FIG. 2. At 1180, the media guidance application may cause control circuitry 904 to calculate an actual promotion offer from the third party for the user based on the subset of profile characteristics which the user has granted the third party access to, such as those calculated by merchant 1017, the actual promotion offer being no greater than the optimal promotion offer.

At 1190, the media guidance application may cause control circuitry 904 to generate for display the actual promotion offer, such as actual promotion offer shown in advertisement 420 of FIG. 4, to the user.

Figure 12:
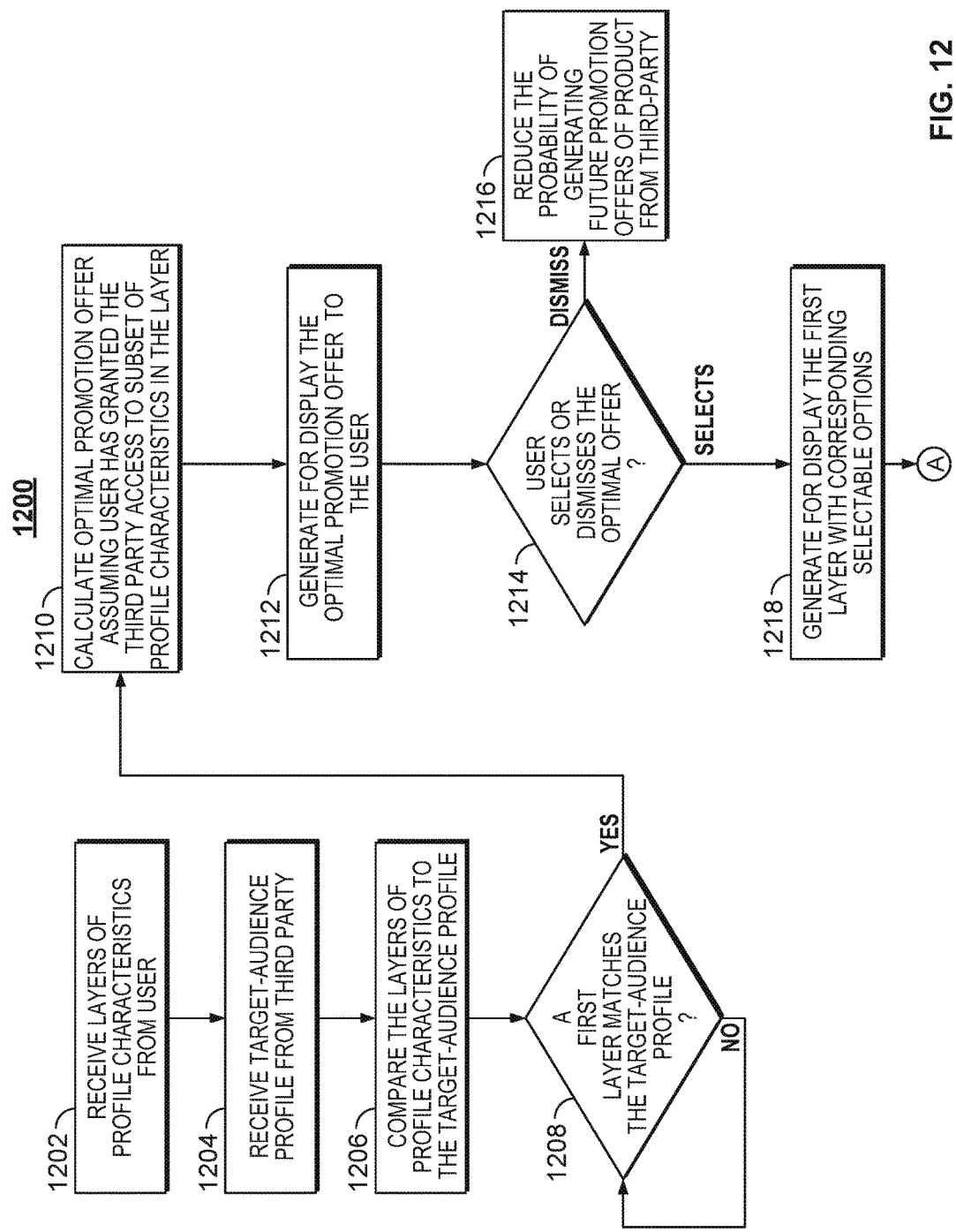
FIG. 12 depicts an illustrative flowchart of a process for enabling a user to exchange portions of profile characteristics for promotion offers from a third party, and enabling the third party to target the user more effectively, in accordance with some embodiments of the disclosure.
Figure 12:
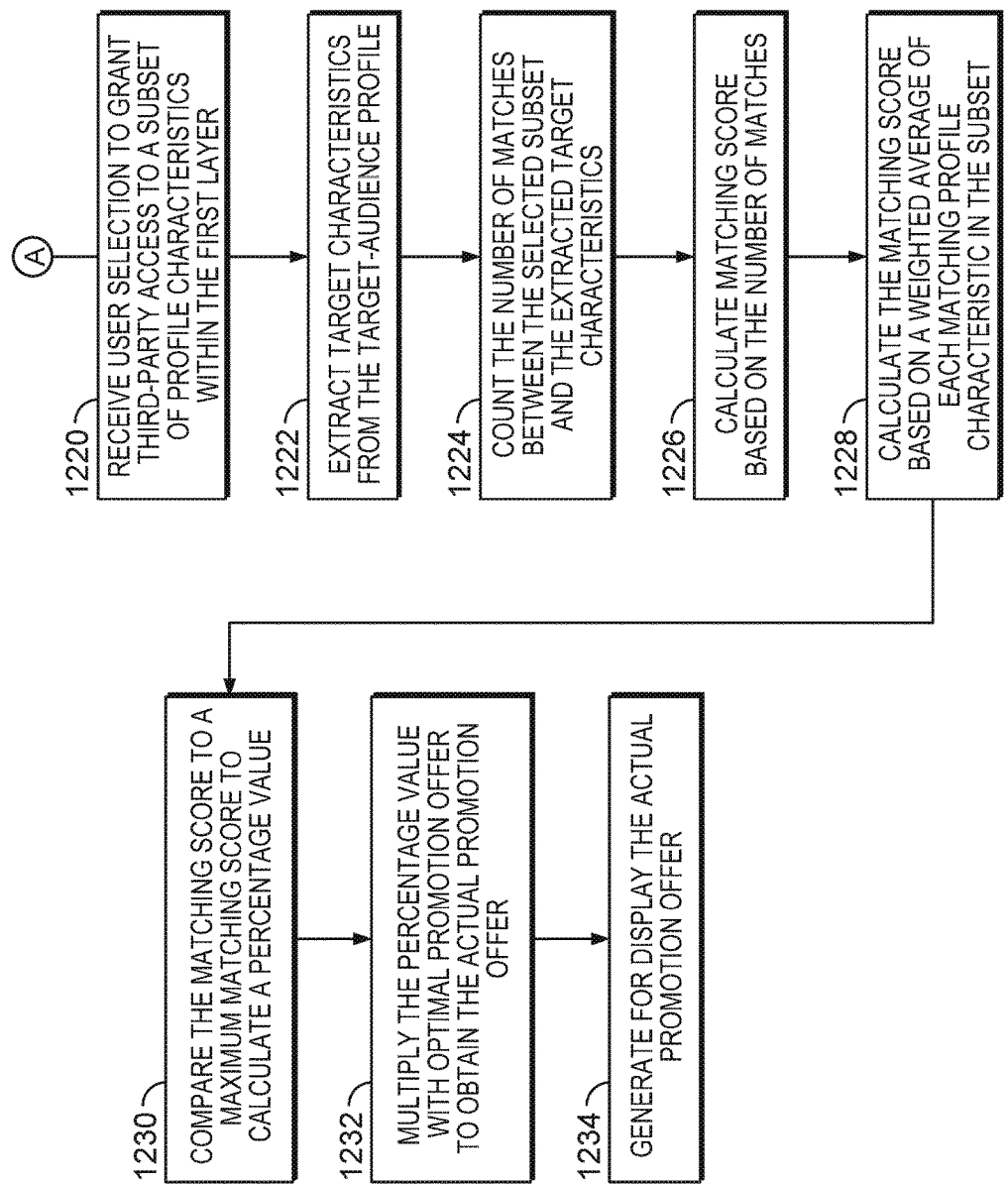

FIG. 12 depicts an illustrative flowchart of process 1200 for enabling a user to exchange portions of profile characteristics for promotion offers from a third party, and enabling the third party to target the user more effectively, in accordance with some embodiments of the disclosure. In some embodiments, this process may be encoded on to non-transitory storage medium (e.g., storage device 908) as a set of instructions to be decoded and executed by processing circuitry (e.g., processing circuitry 906). Processing circuitry may in turn provide instructions to other sub-circuits contained within control circuitry 904, such as the tuning, video generating, encoding, decoding, encrypting, decrypting, scaling, analog/digital conversion circuitry, and the like.

At 1202 of process 1200, a media guidance application may cause control circuitry 904 at central exchange 1015 or merchant 1017 to receive layers of profile characteristics from a user, such as by having the user answer questions about her profile data or polling profile information from one or more sources, e.g., user profile database 1013. At 1204, the media guidance application may cause control circuitry 904 to receive target-audience profile from a third party, such as merchant 1017 or advertisement provider 1019, by way of interface 300 as shown in FIG. 3.

At 1206, the media guidance application may cause control circuitry 904 to compare the layers of profile characteristics to the target-audience profile. At 1208, the media guidance application may cause control circuitry 904 to determine whether a first layer, such as Basic Layer 210, matches the target-audience profile. In response to determining that the first layer does not match the target-audience profile, the media guidance application may cause control circuitry 904 to loop at 1208. However, in response to determining that the first layer matches the target-audience profile, the media guidance application may cause control circuitry 904 to proceed to 1210 and calculate an optimal promotion offer assuming the user has granted the third party access to a predetermined subset of profile characteristics within the layer. For example, advertisement 120, which indicates an optimal promotion offer of "up to $5.00 off," may be calculated assuming the user has granted the third party merchant or advertiser access to all her profile characteristics.

At 1212, the media guidance application may cause control circuitry 904 to generate for display the optimal promotion offer to the user. For example, control circuitry 904 of central exchange 1015 may generate for display advertisement 120 to the user on user interface 100. At 1214, the media guidance application may cause control circuitry 904 to receive a user selection to select or dismiss the optimal promotion offer. In response to receiving a user selection to dismiss the optimal promotion offer, at 1216, the media guidance application may cause control circuitry 904 to reduce the probability of generating future promotion offers from the third party. If, however, control circuitry 904 receives user selection to select the optimal promotion offer, such as advertisement 120, the media guidance application may cause control circuitry 904 to generate for display the first layer within corresponding selectable options to the user, such as the Basic Layer 210 on user interface 200, at 1218.

At 1220, the media guidance application may cause control circuitry 904 to receive user selection to grant third party access to a subset of profile characteristics within the first layer, such as profile characteristics "Gender," "Age," and "Education" as indicated on user interface 200. At 1222, control circuitry 904 may extract target characteristics from the target-audience profile, such as target characteristics "Age" 310, "Education" 330, and "Sports Preference" 340, as indicated on interface 300. At 1224, the media guidance application may cause control circuitry 904 to count the number of matches between the selected subset and the extract target characteristics. In the above example, the number of matches is two—corresponding to "Age" and "Education."

At 1226, the media guidance application may cause control circuitry 904 to calculate a matching score based on the number of matches. The matching score may be calculated using any of a plurality of algorithms as described in the present disclosure. For example, at 1228, the media guidance application may cause control circuitry 904 to calculate the matching score based on a weighted average of each matching profile characteristic in the subset. At 1230, the media guidance application may cause control circuitry 904 to compare the matching score to a maximum matching score, which corresponds to the optimal promotion offer, to calculate a percentage value. At 1232, the media guidance application may cause control circuitry 904 to multiply the percentage value with the optimal promotion offer to obtain an actual promotion offer specifically for the user.

At 1234, the media guidance application may cause control circuitry 904 to generate for display the actual promotion offer, e.g., updated advertisement 420, to the user, using display 912 of a user equipment device such as user computer equipment 1004. Although the above disclosure uses embodiments which are directed to providing higher discounts for users that match more closely to the target-audience profile as set up by the third party, it is understood that the converse could be true—that is, a user who is more closely matched with the target-audience profile might be offered a lower discount, whereas a user who is further from the "ideal user" as defined by the target-audience profile might be given a higher discount. One justification for this embodiment is that users who are similar to the target-audience profile may harbor more affinity to the products and services offered by the third party business, even with less promotion offered. In other words, these users might not be as discount-sensitive to users who are not similar to the target audience. These and other embodiments are understood to be well within the teachings of the current disclosure.

Figure 13:
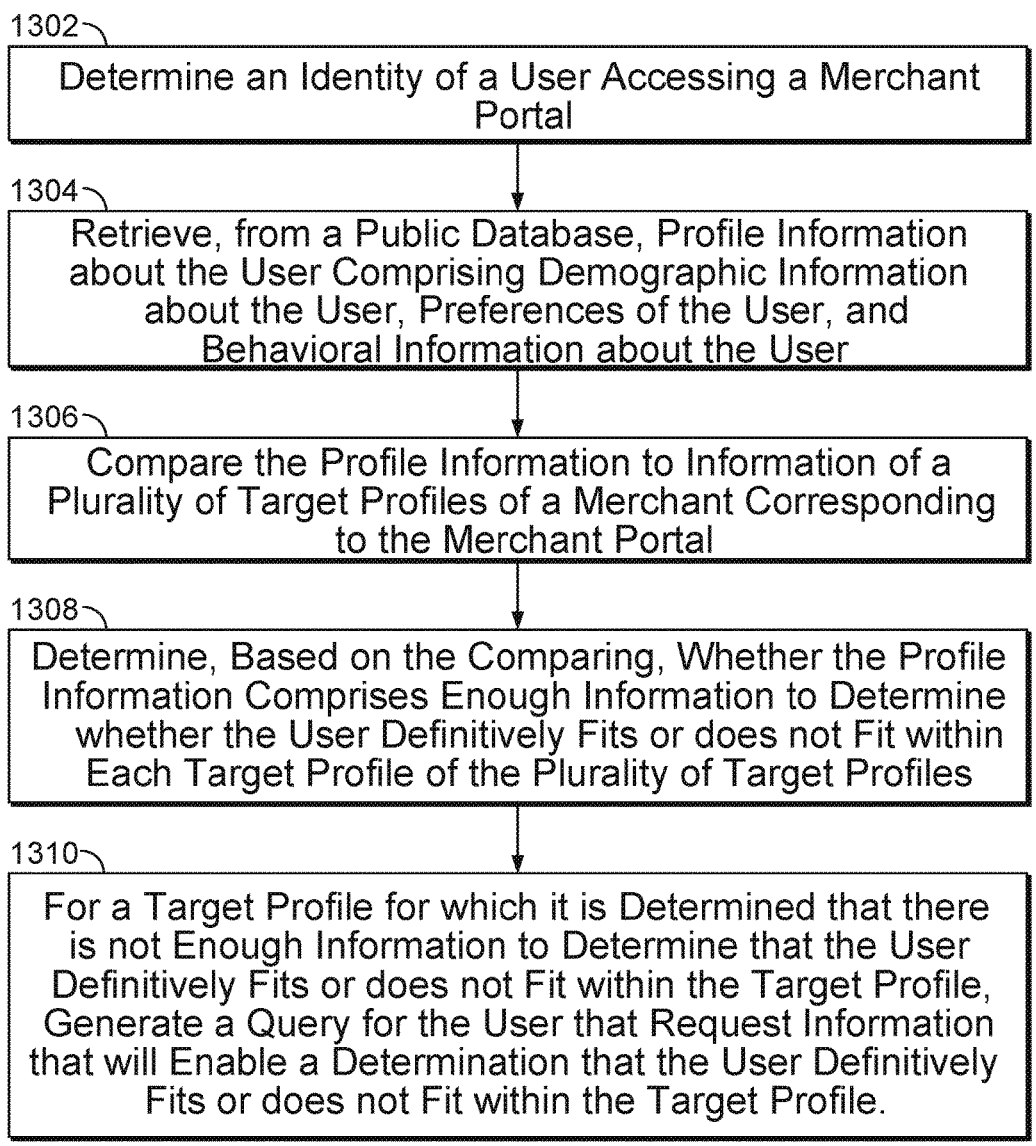
FIG. 13 is a flowchart of illustrative steps involved in generating a query for requesting information that will enable a determination of whether a user definitively fits or does not fit a target audience profile, in accordance with some embodiments of the disclosure.

FIG. 13 is a flowchart of illustrative steps involved in generating a query for requesting information that will enable a determination of whether a user definitively fits or does not fit a target audience profile, in accordance with some embodiments of the disclosure. Process 1300 may be executed by control circuitry 904 (FIG. 9) as instructed by the media guidance application. Control circuitry 1004 may be implemented on user equipment 1002, 1004, and/or 1006 (FIG. 10). In addition, one or more steps of process 1300 may be incorporated into or combined with one or more steps of any other process or embodiment.

Process 1300 begins at 1302 where control circuitry 904 determines an identity of a user accessing a merchant portal. For example, control circuitry 904 may identify user 102 as Amy, in manners described previously with respect to FIG. 1. Process 1300 continues to 1304 where control circuitry 904 retrieves, from a public database, profile information about the user comprising demographic information about the user, preferences of the user, and behavioral information about the user. For example, control circuitry 904 may retrieve profile information about the user from a local public database located at storage 908 or a remote public database, accessible via communications network 614, located at user profile database 1013 and/or media guidance data source 1018. Process 1300 continues to 1306 where control circuitry 904 compares the profile information to information of a plurality of target audience profiles of a merchant corresponding to the merchant portal. As an illustrative example, control circuitry 904 may retrieve, for a sporting goods store called REI, target audience profiles for specific good and service that REI sells. Control circuitry 904 may retrieve the target audience profiles from merchant 1017 and/or media guidance data source 1018.

Process 1300 continues to 1308 where control circuitry 904 determines, based on the comparing, whether the profile information comprises enough information to determine whether the user definitively fits or does not fit within each target audience profile of the plurality of target audience profiles. As an illustrative example, control circuitry 904 may compare user profile information with the target audience profile for skiing equipment to determine whether the user fits or does not fit the target audience profile for skiing equipment. Manners in which control circuitry 904 may perform this determination described previously with respect to FIG. 1 are applicable here. Process 1300 continues to 1310 where control circuitry 904, for a target audience profile for which it is determined that there is not enough information to determine that the user definitively fits or does not fit within the target audience profile, generates a query for the user that requests information that will enable a determination that the user definitively fits or does not fit within the target audience profile. Following from the example above, control circuitry 904 may generate a query that asks "Do you enjoy skiing?" in order to determine whether the user fits or does not fit the target audience profile for skiing equipment. Control circuitry 904 may generate for display the query on any of user television equipment 1002, user computer equipment 1004 and/or wireless user communications device 1006.

Figure 14:
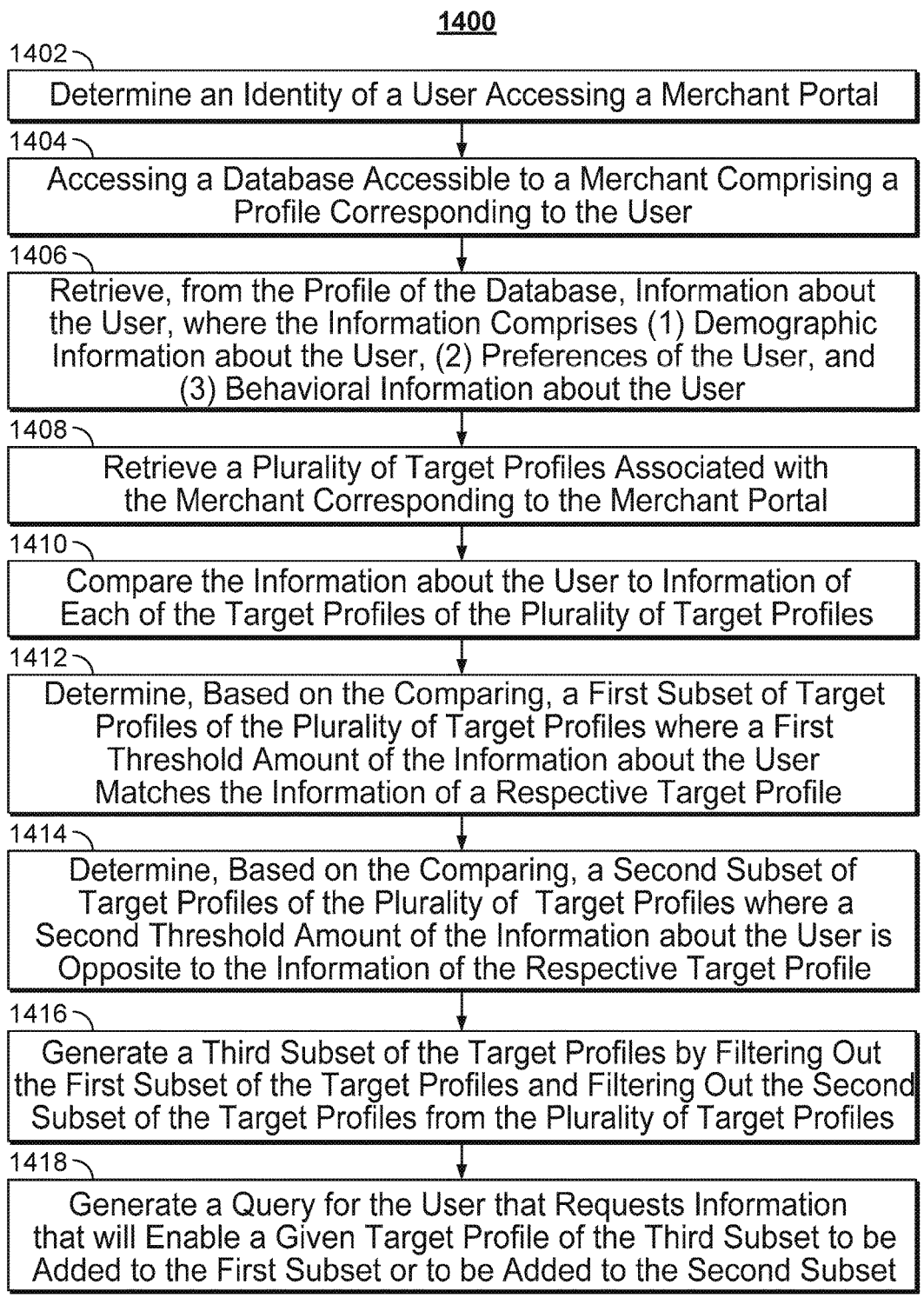
FIG. 14 is a flowchart of illustrative steps involved in generating a query for requesting information that will enable a target audience profile to be classified either into a fits the user subset or does not fit the user subset, in accordance with some embodiments of the disclosure.

FIG. 14 is a flowchart of illustrative steps involved in generating a query for requesting information that will enable a target audience profile to be classified either into a fits the user subset or does not fit the user subset, in accordance with some embodiments of the disclosure. Process 1400 may be executed by control circuitry 904 (FIG. 9) as instructed by the media guidance application. Control circuitry 904 may be implemented on user equipment 1002, 1004, and/or 1006 (FIG. 10). In addition, one or more steps of process 1400 may be incorporated into or combined with one or more steps of any other process or embodiment.

Process 1400 begins at 1402 where control circuitry 904 determines an identity of a user accessing a merchant portal. For example, control circuitry 904 may identify, based on input received via user input interface 910 and/or information retrieved from user profile database 1013 and/or media guidance data source 1018, user 102 as Amy. Manners in which control circuitry 904 may perform this identification described previously with respect to FIG. 1 are applicable here. Process 1400 continues to 1404 where control circuitry 904 accesses a database accessible to the merchant comprising a profile corresponding to the user. For example, control circuitry 904 may access a database located locally at storage 908 or remotely user profile database 1013 and/or media guidance data source 1018. Process 1400 continues to 1406 where control circuitry 904 retrieves, from the profile of the database, information about the user, where the information comprises (1) demographic information about the user, (2) preferences of the user, and (3) behavioral information about the user.

Process 1400 continues to 1408 where control circuitry 904 retrieves a plurality of target audience profiles associated with a merchant corresponding to the merchant portal. As an illustrative example, control circuitry 904 may retrieve, for a sporting goods store called REI, target audience profiles for specific good and service that REI sells (e.g., target audience profile for skiing, target audience profile for vacation packages, target audience profile for tennis equipment). Control circuitry 904 may retrieve the target audience profiles from merchant 1017 and/or media guidance data source 1018. Process 1400 continues to 1410 where control circuitry 904 compares the information about the user to information of each of the target audience profiles of the plurality of target audience profiles.

Process 1400 continues to 1412 where control circuitry 904 determines, based on the comparing, a first subset of target audience profiles of the plurality of target audience profiles where a first threshold amount of the information about the user matches the information of a respective target audience profile. As an illustrative example, control circuitry 904 may determine, based on information about the user that indicates that the user enjoys playing tennis and target audience profile for tennis equipment, that the user is a good candidate to advertise the tennis equipment to. Process 1400 continues to 1414 where control circuitry 904 determines, based on the comparing, a second subset of target audience profiles of the plurality of target audience profiles where a second threshold amount of the information about the user is contradictory to the information of the respective target audience profile. For example, the information about the user may indicate that the user consistently declines vacation packages. Accordingly, control circuitry 904 may the target audience profile for the vacation package to the second subset.

Process 1400 continues to 1416 where control circuitry 904 generates a third subset of the target audience profiles by filtering out the first subset of the target audience profiles and filtering out the second subset of the target audience profiles from the plurality of target audience profiles. Following from the previous example, control circuitry 904 may filter out target audience profile for skiing and target audience profile for vacation packages. For example, control circuitry 904 does not have enough information to determine whether the user is a good candidate to be offered a promotion about skiing equipment, and control circuitry 904 may include target audience profile for the skiing equipment in the third subset. Process 1400 continues to 1418 where control circuitry 904 generates a query for the user that requests information that will enable a given target audience profile of the third subset to be added to the first subset or to be added to the second subset. Following from the example above, control circuitry 904 may generate a query "Do you enjoy skiing?" for determining whether the user fits or does not fit the target audience profile for skiing equipment. Control circuitry 904 may generate for display the query on any of user television equipment 1002, user computer equipment 1004 and/or wireless user communications device 1006.

Figure 15:
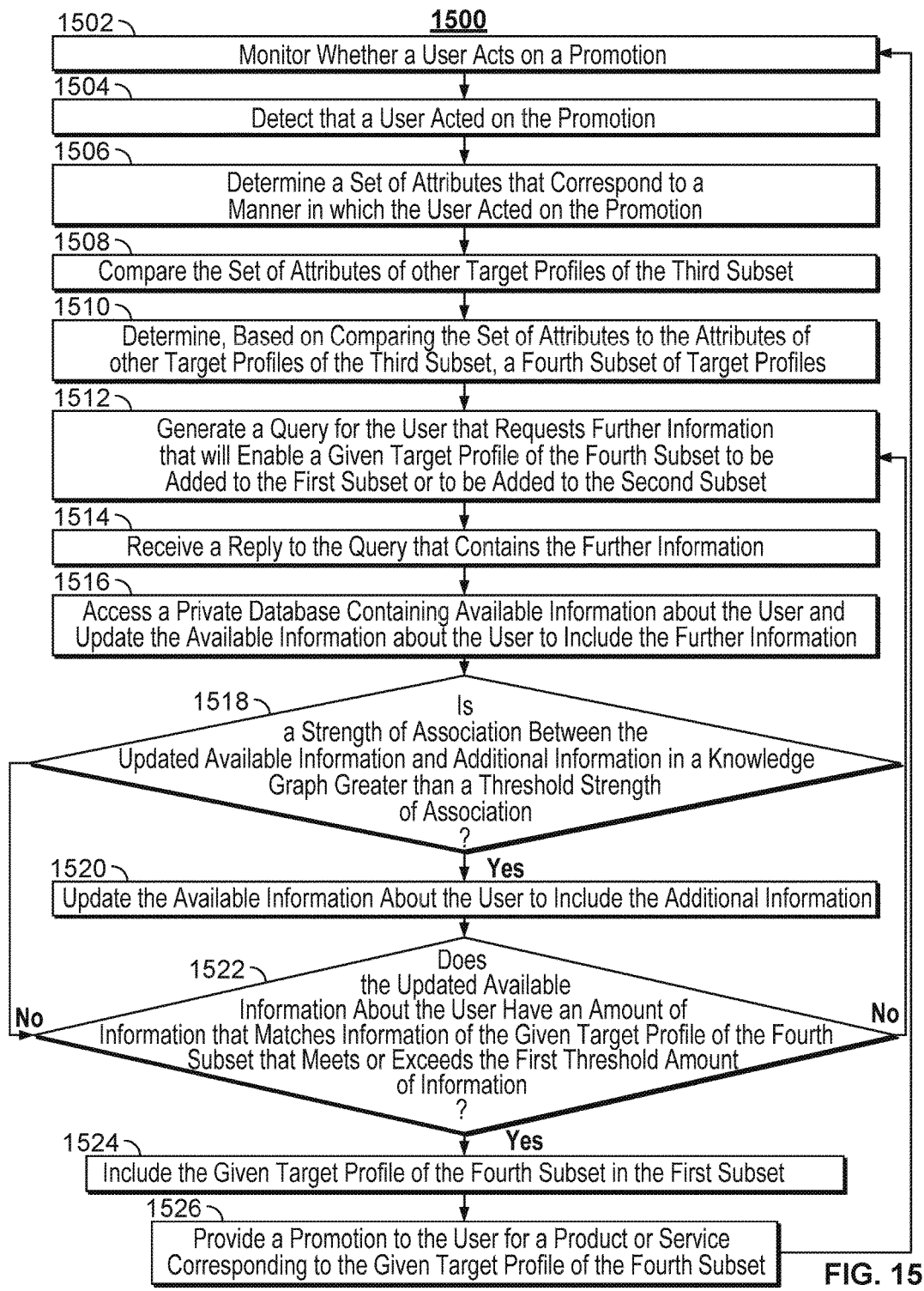
FIG. 15 is a flowchart of illustrative steps involved in determining, based on a user's response to a promotion associated with a target audience profile, another promotion associated with another target audience profile for presentation to the user, in accordance with some embodiments of the disclosure.

FIG. 15 is a flowchart of illustrative steps involved in determining, based on a user's response to a promotion associated with a target audience profile, another promotion associated with another target audience profile for presentation to the user, in accordance with some embodiments of the disclosure. Process 1500 may be executed by control circuitry 904 (FIG. 9) as instructed by the media guidance application. Control circuitry 904 may be implemented on user equipment 1002, 1004, and/or 1006 (FIG. 10). In addition, one or more steps of process 1500 may be incorporated into or combined with one or more steps of any other process or embodiment.

Process 1500 begins at 1502 where control circuitry 904 monitors whether a user acts on a promotion. Process 1500 continues to 1504 where control circuitry 904 detects that a user acted on the promotion. For example, control circuitry 904 may detect that a user has acted on the promotion upon receiving an input via user input interface 910. Process 1500 continues to 1506 where control circuitry 904 determines a set of attributes that correspond to a manner in which the user acted on the promotion. As an illustrative example, the user may respond to a promotion for ski equipment by purchasing the ski equipment. Process 1500 continues to 1508 where control circuitry 904 compares the set of attributes to attributes of other target audience profiles of the third subset. Control circuitry 904 may retrieve the other target audience profiles of the third subset from merchant 1017 and/or media guidance data source 1018.

Process 1500 continues to 1510 where control circuitry 904 determines, based on comparing the set of attributes to the attributes of other target audience profiles of the third subset, a fourth subset of target audience profiles. For example, control circuitry 904 may determine ski-equipment related target audience profiles as a fourth subset. Process 1500 continues to 1512 where control circuitry 904 generates a query for the user that requests further information that will enable a given target audience profile of the fourth subset to be added to the first subset or to be added to the second subset. For example, control circuitry 904 may generate a query (displayed on any of user equipment 1002, 1004 and 1006) such as "Did you buy the skiing equipment for yourself or for a family member?" to determine whether a target audience profile for an avid skier matches the user.

Process 1500 continues to 1514 where control circuitry 904 receives a reply to the query that contains the further information. Following from the example above, control circuitry 904 may receive, via user input interface 910, a query reply of "For a family member." Process 1500 continues to 1516 where control circuitry 904 accesses a private database containing available information about the user (e.g., and update the available information about the user to include the further information. For example, control circuitry 904 may update the available information about the user, stored at any of merchant 1017, media guidance data source 618 and/or user profile database 613, to indicate that the user is not interested in ski equipment for himself.

Process 1500 continues to 1518 where control circuitry 904 determines whether a strength of association between the updated available information and additional information in a knowledge graph is greater than a threshold strength of association. As previously discussed, the knowledge graph may be stored in a local database, such as merchant's private database, or a remote database in the cloud, such as user profile database 1013. Control circuitry 904 may retrieve the knowledge graph from the database to make the aforementioned determination. For example, control circuitry 904 may consult the knowledge graph stored in the database to determine that the ski equipment purchased by the user was for a male child. Control circuitry 904 may determine, based on the type of ski equipment purchased, that the user has a male child. Control circuitry 904 may determine whether strength of association between the updated available information and additional information that the user has a male child is greater than a threshold strength of association. If, at 1518, control circuitry 904 determines the strength of association between the updated available information and the additional information in a knowledge graph is greater than the threshold strength of association, process 1500 continues to 1520. At 1520, control circuitry 904 updates the available information about the user to include the additional information. For example, control circuitry 904 may update the available information about the user to include that the user has a male child.

Process 1500 continues to 1522 where control circuitry 904 determines whether the updated available information about the user has an amount of information that matches information of the given target audience profile of the fourth subset that meets or exceeds the first threshold amount of information. Process 1500 also continues to 1522 if, at 1518, control circuitry 904 determines the strength of association between the updated available information and the additional information in a knowledge graph is not greater than the threshold strength of association. For example, control circuitry 904 may determine whether amount of information in the updated available information about the user that matches a target audience profile for male child tennis equipment.

If, at 1522, control circuitry 904 determines that the updated available information about the user does not have an amount of information that matches information of the given target audience profile of the fourth subset that meets or exceeds the first threshold amount of information, process 1500 reverts to 1512. For example, process 1500 may revert to 1512 upon control circuitry 904 determining that the updated available information about the user does not match a target audience profile for male child tennis equipment.

If, at 1522, control circuitry 904 determines that the updated available information about the user has an amount of information that matches information of the given target audience profile of the fourth subset that meets or exceeds the first threshold amount of information, process 1500 continues to 1524. At 1524, control circuitry 904 includes the given target audience profile of the fourth subset in the first subset. Process 1500 continues to 1526 where control circuitry 904 provides a promotion to the user for a product or service corresponding to the given target audience profile of the fourth subset. For example, control circuitry 904 may determine that the matches the target audience profile for male child tennis equipment and include the target audience profile for male child tennis equipment in the first subset. Control circuitry 904 may then provide a promotion for male child tennis equipment. Process 1500 then reverts to 1502.

It should be noted that processes 1300-1500 or any step thereof could be performed on, or provided by, any of the devices shown in FIGS. 9-10. For example, any of processes 1300-1500 may be executed by control circuitry 904 (FIG. 9) as instructed by the media guidance application implemented on user equipment 1002, 1004, and/or 1006 (FIG. 10). In addition, one or more steps of process 1300-1500 may be incorporated into or combined with one or more steps of any other process or embodiment.

It is contemplated that the steps or descriptions of FIGS. 11-15 may be used with any other embodiment of this disclosure. In addition, the steps and descriptions described in relation to FIGS. 11-15 may be done in alternative orders or in parallel to further the purposes of this disclosure. For example, each of these steps may be performed in any order or in parallel or substantially simultaneously to reduce lag or increase the speed of the system or method.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

The processes discussed above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for allowing a user to grant or deny a third party access to different portions of the user's profile characteristics, the method comprising:
    comparing a plurality of layers of profile characteristics associated with a user to a target-audience profile submitted by a third party;
    in response to determining that a first layer of the plurality of layers matches the target-audience profile:
        calculating an optimal promotion offer from the third party based on the first layer of profile characteristics; and
        generating for display the optimal promotion offer to the user;
    receiving a first selection of the optimal promotion offer from the user;
    in response to receiving the first selection, generating for display at least a portion of the first layer of profile characteristics, each profile characteristic of the first layer of profile characteristics having a corresponding selectable option to grant the third party access to the corresponding profile characteristic;
    receiving a second selection from the user of selectable options corresponding to a subset of the profile characteristics within the first layer of profile characteristics;
    in response to receiving the second selection from the user, granting the third party access to the subset of profile characteristics;
    extracting a plurality of target characteristics from the target-audience profile submitted by the third party;
    counting a number of profile characteristics, from the subset of profile characteristics, that matches the plurality of target characteristics;
    calculating a matching score for the user based on the number of matching profile characteristics in the subset;
    determining a maximum matching score corresponding to the optimal promotion offer;
    comparing the matching score with the maximum matching score to calculate a percentage value;
    multiplying the percentage value with the optimal promotion offer to obtain the actual promotion offer; and
    generating for display the actual promotion offer to the user.

2. The method of claim 1, wherein the optimal promotion offer from the third party is calculated assuming the user has granted the third party access to a predetermined subset of profile characteristics within the first layer.

3. The method of claim 1, wherein receiving the second selection from the user further comprises receiving a selection from the user to grant the third party access to both the subset of profile characteristics within the first layer and profile characteristics within a second layer of profile characteristics.

4. The method of claim 3, wherein calculating the actual promotion offer from the third party further comprises calculating the actual promotion offer based on both the subset of profile characteristics within the first layer and a further subset of profile characteristics within the second layer.

5. The method of claim 1, wherein generating for display the actual promotion offer further comprises generating for display a targeted advertisement for a product associated with the user's profile characteristics.

6. The method of claim 1, further comprising:
    in response to receiving a selection from the user to dismiss the optimal promotion offer, reducing the probability of generating future promotion offers associated with a product from the third party.

7. The method of claim 1, further comprising calculating the matching score for the user based on a weighted average of each matching profile characteristic in the subset.

8. The method of claim 1, wherein the displayed actual promotion offer is dynamically updated based on the user's selections of profile characteristics in real time.

9. A system for allowing a user to grant or deny a third party access to different portions of the user's profile characteristics, the system comprising:
    control circuitry configured to:
        compare a plurality of layers of profile characteristics associated with a user to a target-audience profile submitted by a third party;
        in response to determining that a first layer of the plurality of layers matches the target-audience profile:
            calculate an optimal promotion offer from the third party based on the first layer of profile characteristics; and
            generate for display the optimal promotion offer to the user;
        receive a first selection of the optimal promotion offer from the user;
        in response to receiving the first selection, generate for display at least a portion of the first layer of profile characteristics, each profile characteristic of the first layer of profile characteristics having a corresponding selectable option to grant the third party access to the corresponding profile characteristic;
        receive a second selection from the user of selectable options corresponding to a subset of the profile characteristics within the first layer of profile characteristics;

in response to receiving the second selection from the user, grant the third party access to the subset of profile characteristics;

extract a plurality of target characteristics from the target-audience profile submitted by the third party;

count a number of profile characteristics, from the subset of profile characteristics, that matches the plurality of target characteristics;

calculate a matching score for the user based on the number of matching profile characteristics in the subset determine a maximum matching score corresponding to the optimal promotion offer;

compare the matching score with the maximum matching score to calculate a percentage value;

multiply the percentage value with the optimal promotion offer to obtain the actual promotion offer; and generate for display the actual promotion offer to the user.

10. The system of claim 9, wherein the optimal promotion offer from the third party is calculated assuming the user has granted the third party access to a predetermined subset of profile characteristics within the first layer.

11. The system of claim 9, wherein the control circuitry is further configured to receive the second selection from the user by receiving a selection from the user to grant the third party access to both the subset of profile characteristics within the first layer and profile characteristics within a second layer of profile characteristics.

12. The system of claim 11, wherein the control circuitry is further configured to calculate the actual promotion offer from the third party by calculating the actual promotion offer based on both the subset of profile characteristics within the first layer and a further subset of profile characteristics within the second layer.

13. The system of claim 9, wherein the control circuitry is further configured to generate for display the actual promotion offer by generating for display a targeted advertisement for a product associated with the user's profile characteristics.

14. The system of claim 9, wherein the control circuitry is further configured to:

in response to receiving a selection from the user to dismiss the optimal promotion offer, reduce the probability of generating future promotion offers associated with a product from the third party.

15. The system of claim 9, wherein the control circuitry is further configured to:

calculate the matching score for the user based on a weighted average of each matching profile characteristic in the subset.

16. The system of claim 9, wherein the displayed actual promotion offer is dynamically updated based on the user's selections of profile characteristics in real time.

* * * * *